(12) United States Patent
Shingai et al.

(10) Patent No.: US 8,325,125 B2
(45) Date of Patent: Dec. 4, 2012

(54) DISPLAY APPARATUS, DRIVING METHOD AND DISPLAY DRIVING CONTROLLER OF CHOLESTERIC LIQUID CRYSTAL DISPLAY PANEL

(75) Inventors: Tomohisa Shingai, Kawasaki (JP); Masaki Nose, Kawasaki (JP); Hirokata Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 12/715,019

(22) Filed: Mar. 1, 2010

(65) Prior Publication Data
US 2010/0225677 A1 Sep. 9, 2010

(30) Foreign Application Priority Data
Mar. 3, 2009 (JP) ................................. 2009-049612

(51) Int. Cl.
*G09G 3/36* (2006.01)
(52) U.S. Cl. ............. 345/94; 345/208; 345/690; 345/89
(58) Field of Classification Search .................... 345/89, 345/94, 95, 208, 210, 690, 204; 349/169, 349/179
See application file for complete search history.

(56) References Cited

U.S. PATENT DOCUMENTS

| 5,748,277 | A | 5/1998 | Huang |
| 6,414,669 | B1 | 7/2002 | Masazumi |
| 8,144,091 | B2* | 3/2012 | Nose ................ 345/87 |
| 2005/0259059 | A1* | 11/2005 | Park et al. .......... 345/89 |
| 2006/0262058 | A1 | 11/2006 | Hara et al. |
| 2008/0024412 | A1 | 1/2008 | Nose |
| 2008/0259015 | A1 | 10/2008 | Nose |
| 2009/0058779 | A1* | 3/2009 | Yoshihara et al. .... 345/89 |
| 2009/0153757 | A1* | 6/2009 | Nose ................ 349/35 |
| 2009/0284691 | A1* | 11/2009 | Marhefka et al. .... 349/86 |

FOREIGN PATENT DOCUMENTS

| JP | 11-326871 A | 11/1999 |
| JP | 2002-62520 A | 2/2002 |
| JP | 2006-330035 A | 12/2006 |
| JP | 2007-128043 A | 5/2007 |
| JP | 2008-268566 A | 11/2008 |
| WO | WO-2006/103738 | 10/2006 |

OTHER PUBLICATIONS

Jon, Ruth et al., "Low Cost Dynamic Drive Scheme for Reflective Bistable Cholesteric Liquid Crystal Displays", Flat Panel Displays, 1997.
X, Y H. et al., "Gray Scale of Bistable Reflective Cholesteric Displays", SID 98 Digest 1998.

* cited by examiner

*Primary Examiner* — Lun-Yi Lao
*Assistant Examiner* — Tom Sheng
(74) *Attorney, Agent, or Firm* — Fujitsu Patent Center

(57) ABSTRACT

A display apparatus includes a cholesteric liquid crystal display panel, a control circuit and a driving circuit. The control circuit classifies pixels into different gradation level groups. The driving circuit applies a first driving waveform to the cholesteric liquid crystal display panel to bring pixels belonging to the first and the fourth group into a state corresponding to the highest gradation level, pixels belonging to the second group into a state corresponding to the lowest gradation level, and pixels belonging to the third group into states corresponding to gradation levels to be displayed, and applies a second driving waveform to the cholesteric liquid crystal display panel to bring pixels belonging to the fourth group into states corresponding to gradation levels to be displayed.

20 Claims, 22 Drawing Sheets

$\overleftrightarrow{2\,ms}$ $\overleftrightarrow{1\,ms}$

NON-DYNAMIC DRIVING

DYNAMIC DRIVING

FIG. 9

| EXAMPLE | BROAD CLASSIFICATION | DISPLAY TIME | CONTRAST | HALFTONE |
|---|---|---|---|---|
| 1 | NON-DYNAMIC DRIVING | 4 SECONDS | Good | Poor |
| 2 | NON-DYNAMIC DRIVING | 24 SECONDS | Good | Good |
| 3 | NON-DYNAMIC DRIVING | 10 SECONDS | Fair | Good |
| 4 | DYNAMIC DRIVING | 1 SECOND | Fair | Poor |
| 5 | COMBINED USE OF NON-DYNAMIC DRIVING AND DYNAMIC DRIVING | 21 SECONDS | Good | Good |

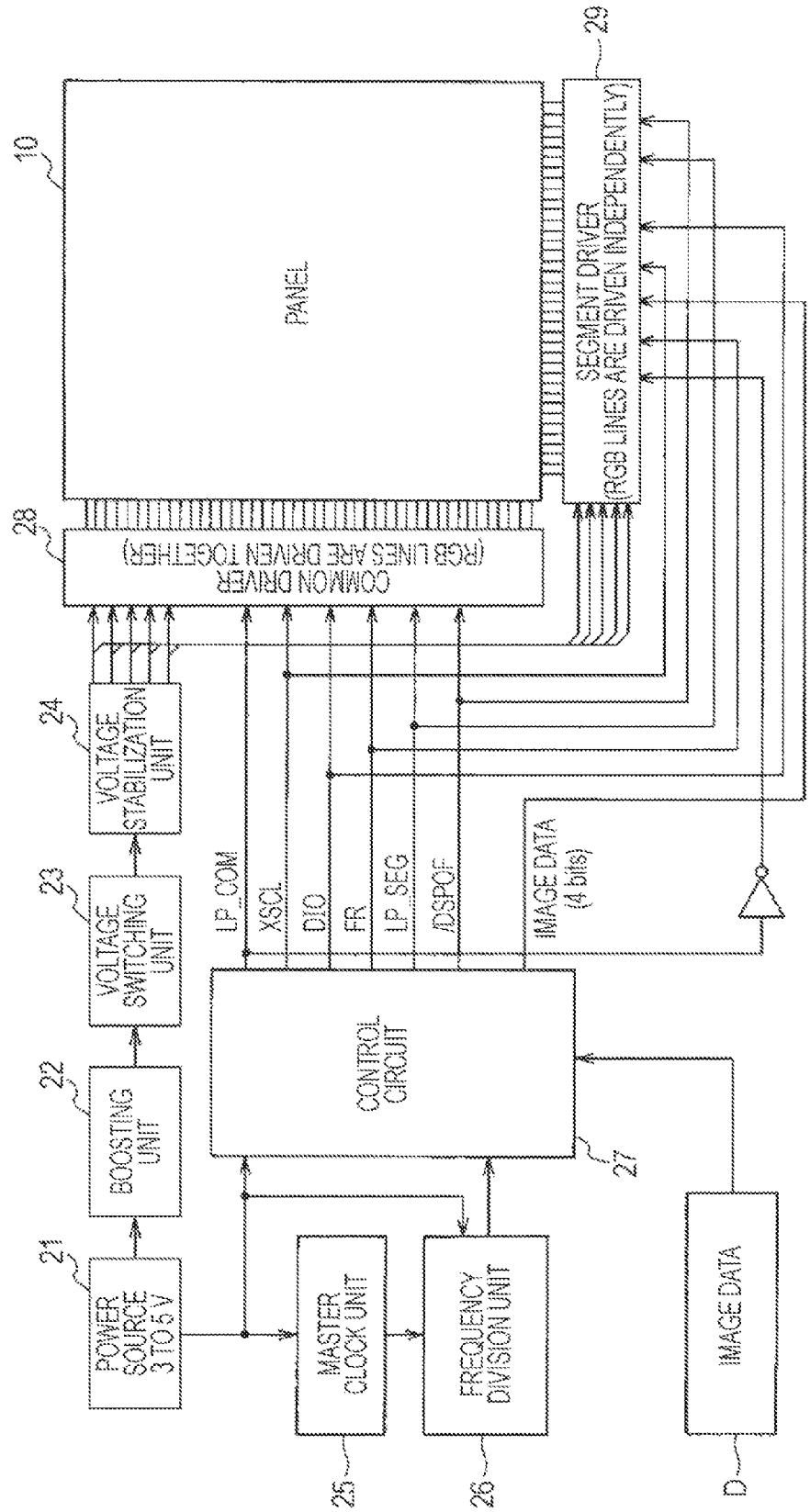

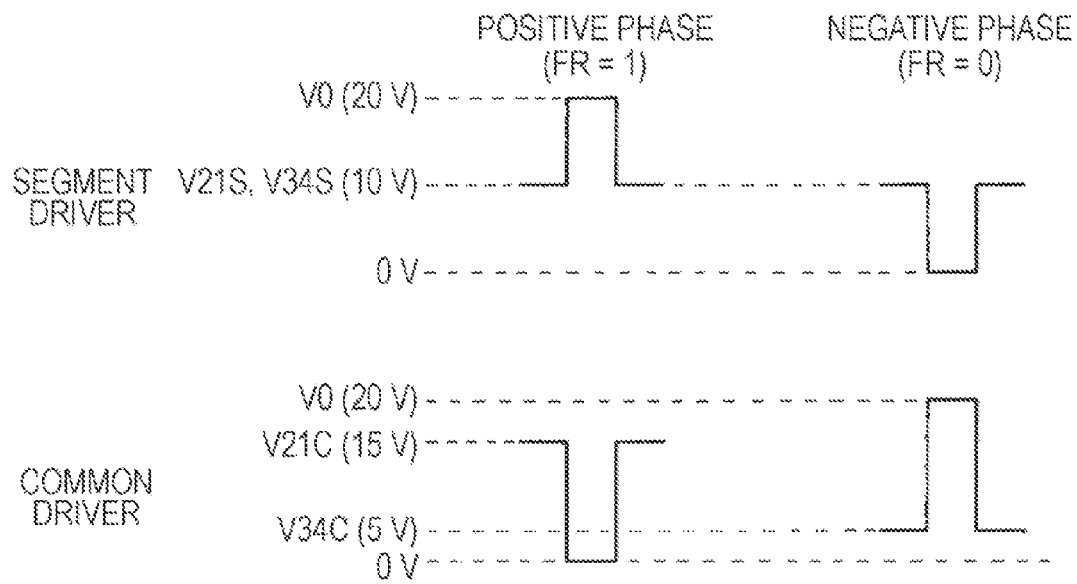

FIG. 22A

Bayer TYPE

| 0 | 2 |
|---|---|
| 3 | 1 |

FIG. 22B

SPIRAL TYPE

| 0 | 1 |
|---|---|
| 3 | 2 |

FIG. 23

GRADATION LEVEL 0

| 0 | 0 |
|---|---|
| 0 | 0 |

GRADATION LEVEL 1

| 4 | 0 |
|---|---|
| 0 | 0 |

GRADATION LEVEL 2

| 4 | 0 |
|---|---|
| 0 | 4 |

GRADATION LEVEL 3

| 4 | 4 |
|---|---|
| 0 | 4 |

GRADATION LEVEL 4

| 4 | 4 |
|---|---|
| 4 | 4 |

GRADATION LEVEL 5

| 8 | 4 |
|---|---|
| 4 | 4 |

GRADATION LEVEL 6

| 8 | 4 |
|---|---|
| 4 | 8 |

GRADATION LEVEL 7

| 8 | 8 |
|---|---|
| 4 | 8 |

| GRADATION LEVEL 0 | GRADATION LEVEL 1 | GRADATION LEVEL 2 | GRADATION LEVEL 3 |
|---|---|---|---|
| 0 0 / 0 0 | 2 0 / 0 2 | 2 2 / 2 2 | 4 2 / 2 4 |

| GRADATION LEVEL 4 | GRADATION LEVEL 5 | GRADATION LEVEL 6 | GRADATION LEVEL 7 |
|---|---|---|---|
| 4 4 / 4 4 | 6 4 / 4 6 | 6 6 / 6 6 | 8 6 / 6 8 |

DISPLAY APPARATUS, DRIVING METHOD AND DISPLAY DRIVING CONTROLLER OF CHOLESTERIC LIQUID CRYSTAL DISPLAY PANEL

CROSS-REFERENCE TO RELATED APPLICATION

This application is based upon and claims the benefit of priority of the prior Japanese Patent Application No. 2009-49612 filed on Mar. 3, 2009, the entire contents of which are incorporated herein by reference.

FIELD

Example embodiments described herein relate to a display apparatus provided with a cholesteric liquid crystal display panel, a driving method of the cholesteric liquid crystal display panel and display driving controller.

BACKGROUND

Cholesteric liquid crystals have excellent characteristics such as a capability to semi-permanently retain displayed images (memory characteristic) and a capability to clearly display images in full color at a high contrast and a high resolution, and are attracting much attention as one effective way to realize electronic paper, in particular, color electronic paper. Cholesteric liquid crystals are also called chiral nematic liquid crystals. By adding a relatively large amount of chiral additive (also called chiral material) to a nematic liquid crystal (the amount of chiral additive is several tens of percents of the nematic liquid crystal), molecules of the nematic liquid crystal form a helical cholesteric phase. Cholesteric liquid crystals have such a helical cholesteric phase. Display with a cholesteric liquid crystal is controlled by the alignment states of molecules of the cholesteric liquid crystal.

SUMMARY

According to an aspect of an embodiment, a display apparatus includes a cholesteric liquid crystal display panel for performing multi-gradation display, a control circuit and a driving circuit. The control circuit classifies pixels into a first group for the highest gradation level, a second group for the lowest gradation level, a third group for a low intermediate gradation level close to the lowest gradation level, and a fourth group for a high intermediate gradation level between the highest gradation level and the low intermediate gradation level in accordance with a gradation level to be displayed. The driving circuit which applies a first driving waveform to the cholesteric liquid crystal display panel so as to bring pixels belonging to the first group and the fourth group into a state corresponding to the highest gradation level, pixels belonging to the second group into a state corresponding to the lowest gradation level, and pixels belonging to the third group into states corresponding to gradation levels to be displayed, and applies a second driving waveform to the cholesteric liquid crystal display panel so as to bring pixels belonging to the fourth group into states corresponding to gradation levels to be displayed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram describing characteristics and issues associated with examples.

FIG. 11 is a schematic diagram illustrating a configuration of a color display apparatus according to an embodiment of the present invention.

FIG. 12A is a diagram illustrating a driver output voltage according to an embodiment of the present invention.

FIG. 12B is a diagram illustrating a voltage applied to a liquid crystal according to an embodiment of the present invention.

FIGS. 22A and 22B are diagrams illustrating dither matrixes used in pseudo gradation processing according to the second embodiment.

FIG. 23 is a diagram illustrating the matrix representation of each gradation level for which pseudo gradation processing according to the second embodiment is performed.

DESCRIPTION OF EMBODIMENTS

Figure 1A:
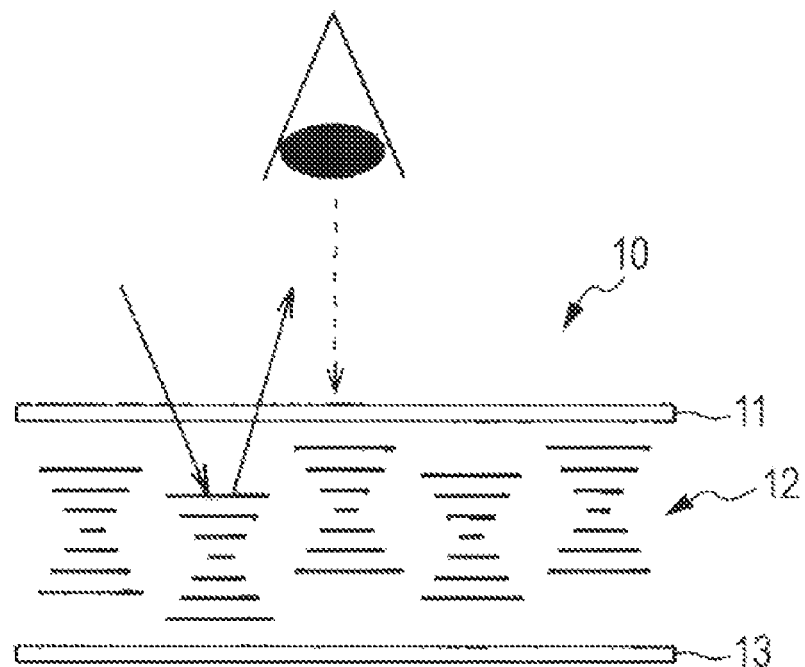
FIG. 1A is a diagram describing a planar state of a cholesteric liquid crystal.
Figure 1B:
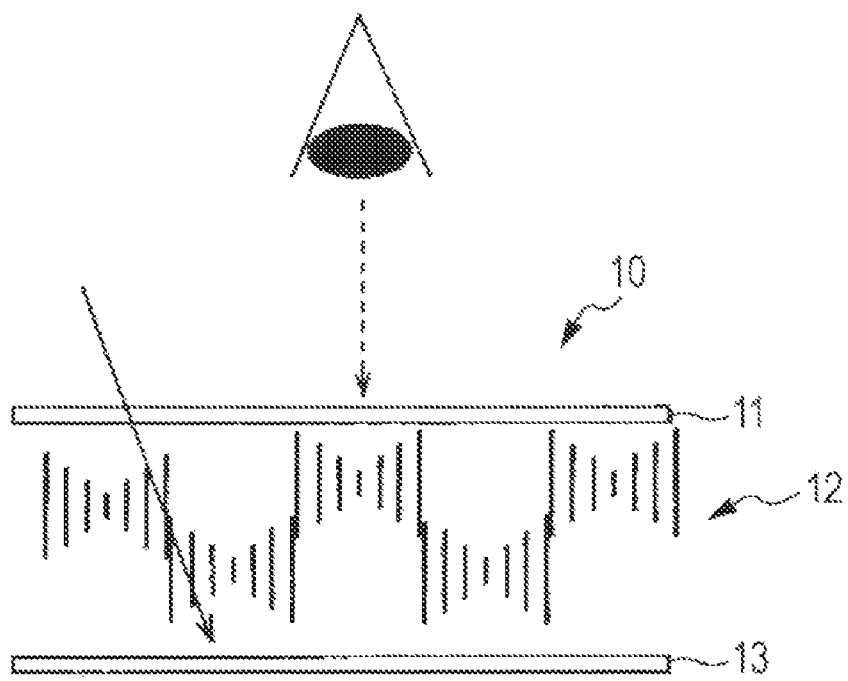
FIG. 1B is a diagram describing a focal conic state of a cholesteric liquid crystal.

FIGS. 1A and 1B are diagrams describing the states of a cholesteric liquid crystal. As illustrated in FIGS. 1A and 1B, a display element 10 using a cholesteric liquid crystal is provided with an upper substrate 11, a cholesteric liquid crystal layer 12, and a lower substrate 13. The alignment states of a cholesteric liquid crystal include a planar state illustrated in FIG. 1A in which incident light is reflected and a focal conic state illustrated in FIG. 1B in which incident light is transmitted. These states are stably held even if no electric field is applied.

In the planar state, light having a wavelength corresponding to the helical pitch of liquid crystal molecules is reflected. A wavelength $\lambda$ at which the highest reflectance is obtained is expressed as $\lambda = n \cdot p$, where n represents a mean refractive index and p represents a helical pitch.

A reflection bandwidth $\Delta\lambda$ increases with an increase in a refractive index anisotropy $\Delta n$ of the liquid crystal.

In the planar state, since incident light is reflected, it is possible to achieve a bright state, that is, to display a color corresponding to the wavelength $\lambda$ (for example, a green color corresponding to the wavelength $\lambda$ of 550 nm). On the other hand, in the focal conic state, since light passes through a liquid crystal layer and is then absorbed into a light absorption layer disposed under the lower substrate 13, it is possible to achieve a dark state, that is, to display a black color.

Next, a method of driving a display element using a cholesteric liquid crystal will be described.

When a strong electric field is applied to a cholesteric liquid crystal, the helical structure of liquid crystal molecules is untangled and the cholesteric liquid crystal is brought into a homeotropic state in which all of the liquid crystal molecules are aligned in the direction of the electric field. Subsequently, when the electric field is rapidly reduced to zero, the helical axis of the cholesteric liquid crystal becomes perpendicular to electrodes and the homeotropic state is changed to a planar state in which light is selectively reflected in accordance with a helical pitch. On the other hand, when an electric field that is sufficiently weak so as not to untangle the helical structure of the liquid crystal molecules is formed and is then removed, or when an intense electric field is applied to the cholesteric liquid crystal and is then gradually removed, the helical axis of the cholesteric liquid crystal becomes parallel to the electrodes and the cholesteric liquid crystal is brought into a focal conic state in which the incident light is transmitted. When a medium intense electric field is applied to the cholesteric liquid crystal and is then rapidly removed, the planar state and the focal conic state coexist and gradations can be displayed. Using the above-described phenomena, image display is performed.

Figure 2:
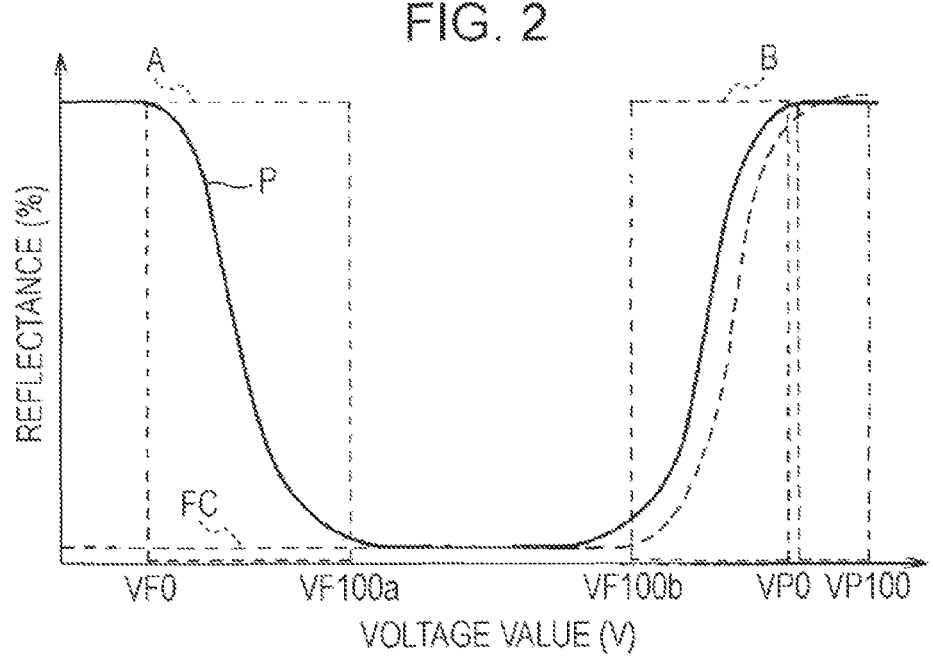
FIG. 2 is a diagram describing the state transition of a cholesteric liquid crystal caused by a pulse voltage.

FIG. 2 is a diagram illustrating an example of a voltage-reflectance characteristic of a cholesteric liquid crystal. A horizontal axis depicts the voltage value (V) of a pulse voltage with a pulse width that is applied across electrodes between which a cholesteric liquid crystal is interposed. A vertical axis depicts the reflectance (%) of the cholesteric liquid crystal. A solid curve P represents the voltage-reflectance characteristic of the cholesteric liquid crystal, the initial state of which is the planar state. A dashed curve FC represents the voltage-reflectance characteristic of the cholesteric liquid crystal, the initial state of which is the focal conic state.

In FIG. 2, when a relatively intense electric field is formed in the cholesteric liquid crystal by applying a high voltage VP100 (for example, ±36 V) between the electrodes, the helical structure of liquid crystal molecules is untangled and the cholesteric liquid crystal is brought into a homeotropic state in which all of the liquid crystal molecules are oriented in the direction of the electric field. Subsequently, when the electric field in the cholesteric liquid crystal is rapidly reduced to substantially zero by rapidly reducing the applied voltage from VP100 to a low voltage (for example, VF0=±9 V), the helical axis of the cholesteric liquid crystal becomes perpendicular to the electrodes and the homeotropic state is changed to the planar state in which light with a wavelength corresponding to a helical pitch is selectively reflected.

On the other hand, when a relatively weak electric field is formed in the cholesteric liquid crystal by applying a low voltage VF100b (for example, ±24 V) between the electrodes, the liquid crystal is brought into a state where the helical structure of the liquid crystal molecules is partially untangled (not completely untangled). In this state, when the electric field in the cholesteric liquid crystal is rapidly reduced to substantially zero by rapidly reducing the applied voltage from VF100b to a low voltage VF0, or when an intense electric field is applied to the cholesteric liquid crystal and is then gradually removed, the helical axis of the liquid crystal molecules becomes parallel to the electrodes and the cholesteric liquid crystal is brought into the focal conic state in which incident light is transmitted.

When a medium intense electric field is applied to the cholesteric liquid crystal and is then rapidly removed, the planar state and the focal conic state coexist. As a result, it is possible to display gradations.

Here, in the case of the curve P illustrated in FIG. 2, in an area A in a dashed frame, it is possible to increase the ratio of the focal conic state and reduce the reflectance of the cholesteric liquid crystal by increasing the voltage value of the applied voltage pulse. In the case of the curves P and FC illustrated in FIG. 2, in an area B in a dashed frame, it is possible to increase the ratio of the focal conic state and reduce the reflectance of the cholesteric liquid crystal by reducing the voltage value of the applied voltage pulse.

In order to display gradations, the area A or B is used. When the area A is used, pixels are initialized to the planar state and then the state of a part of the pixels is changed from the planar state to the focal conic state by applying a voltage pulse between VF0 and VF100a to the cholesteric liquid crystal. When the area B is used, pixels are initialized to the focal conic state and then the state of a part of the pixels is changed from the focal conic state to the planar state by applying a voltage pulse between VF100b and VP0 to the cholesteric liquid crystal.

Figure 3A:
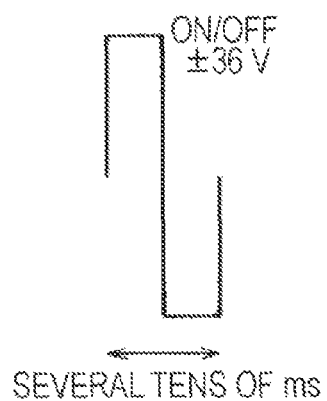
FIG. 3A is a diagram describing an example of a high-voltage pulse with a first pulse width applied to a cholesteric liquid crystal.
Figure 3B:
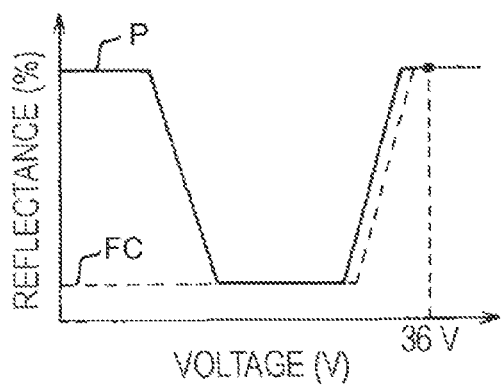
FIG. 3B is a diagram describing an example of the change in the reflectance of the cholesteric liquid crystal to which the pulse voltage illustrated in FIG. 3A is applied.
Figure 4A:
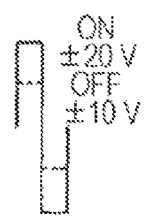
FIG. 4A is a diagram describing an example of a medium-intense pulse voltage with a second pulse width applied to a cholesteric liquid crystal.
Figure 4C:
FIG. 4C is a diagram describing an example of a medium-intense pulse voltage with a third pulse width applied to a cholesteric liquid crystal.
Figure 4B:
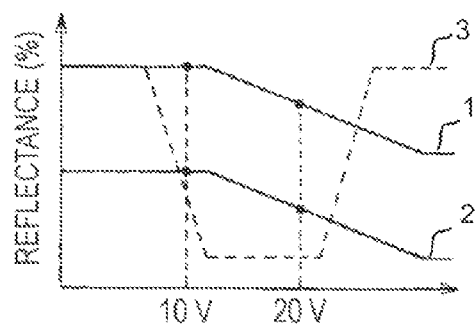
FIG. 4B is a diagram describing an example of the change in the reflectance of the cholesteric liquid crystal to which the pulse voltage illustrated in FIG. 4A is applied.
Figure 4D:
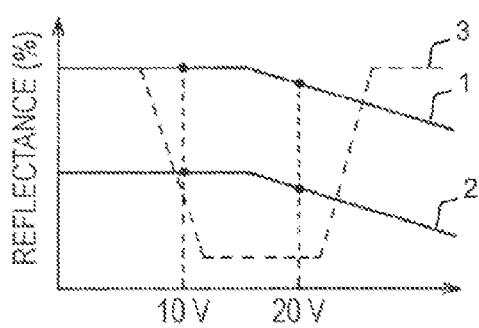
FIG. 4D is a diagram describing an example of the change in the reflectance of the cholesteric liquid crystal to which the pulse voltage illustrated in FIG. 4C is applied.

The principle of a driving method based on the above-described voltage response characteristic will be described with reference to FIGS. 3A to 4D. FIGS. 3A, 4A, and 4C illustrate waveforms of voltage pulses. FIGS. 3B, 4B, and 4D illustrate the pulse response characteristics obtained when the voltage pulses illustrated in FIGS. 3A, 4A, and 4C are applied, respectively. FIG. 3A illustrates a voltage pulse, the voltage value of which is ±36 V and the pulse width of which is several tens of ms. FIG. 4A illustrates a voltage pulse, the voltage value of which is ±20 V at the time of ON and is ±10 V at the time of OFF and the pulse width of which is 2 ms. FIG. 4C illustrates a voltage pulse, the voltage value of which is ±20 V at the time of ON and is ±10 V at the time of OFF and the pulse width of which is 1 ms. In FIGS. 3B, 4B, and 4D, a horizontal axis depicts a voltage (V) and a vertical axis depicts a reflectance (%). In FIG. 3B, the curves P and FC illustrated in FIG. 2 are schematically illustrated as voltage-reflectance characteristics. Solid lines 1 and 2 of FIG. 4B show the pulse response characteristic when the voltage pulse shown in FIG. 4A is impressed. Solid lines 1 and 2 of FIG. 4D show the pulse response characteristic when the voltage pulse shown in FIG. 4C is impressed. Dashed line 3 of FIG. 4B and dashed line 3 of FIG. 4D show solid line P shown in FIG. 3B. As is well known, in order to prevent degradation of a liquid crystal due to ionic polarization, a combination of positive and negative pulses is used as the voltage pulses for driving the liquid crystal.

As illustrated in FIGS. 3A and 3B, under the condition that a pulse width is several tens of ms and an initial state is the planar state, when a voltage is increased to a certain voltage, the cholesteric liquid crystal is brought into the focal conic state. When the voltage is further increased, the cholesteric liquid crystal is brought back into the planar state. Under the condition that the initial state is the focal conic state, when the pulse voltage is increased, the cholesteric liquid crystal is gradually brought into the planar state.

When the pulse width is large, the pulse voltage that always brings the cholesteric liquid crystal into the planar state irrespective of whether the initial state is the planar state or the focal conic state is ±36 V in FIG. 3B, for example. Moreover, when a medium intense pulse voltage is applied to the cholesteric liquid crystal, the planar state and the focal conic state coexist. As a result, gradations may be obtained.

On the other hand, as illustrated in FIGS. 4A and 4B, under the condition that the pulse width is 2 ms and the initial state is the planar state, the reflectance is not changed when a pulse voltage of ±10 V is applied to the cholesteric liquid crystal. However, if a higher pulse voltage higher than ±10 V is applied to the cholesteric liquid crystal, the planar state and the focal conic state coexist and the reflectance is reduced. The amount of decrease in reflectance increases with increase in voltage. However, when a pulse voltage higher than ±36 V is applied to the cholesteric liquid crystal, the amount of decrease in reflectance is constant. This phenomenon also occurs when the planar state and the focal conic state coexist in the initial state. Accordingly, under the condition that the initial state is the planar state, when a voltage pulse with a pulse width of 2 ms and a pulse voltage of ±20 V is applied once, the reflectance is reduced to a certain level. Under the condition that the planar state and the focal conic state coexist and the reflectance is slightly reduced, when a voltage pulse with a pulse width of 2 ms and a pulse voltage of ±20 V is further applied to the cholesteric liquid crystal, the reflectance is further reduced. By repeating this, the reflectance is reduced to a specified value.

As illustrated in FIGS. 4C and 4D, when the pulse width is 1 ms, like when the pulse width is 2 ms, the reflectance is reduced by applying a voltage pulse. However, the amount of decrease in reflectance is smaller than that obtained when the pulse width is 2 ms.

As described previously, when a pulse of ±36 V with a pulse width of several tens of ms is applied to the cholesteric liquid crystal, the cholesteric liquid crystal is brought into the planar state. When a pulse that falls within a range from approximately 10 V to approximately 20 V with a pulse width of approximately 2 ms is applied to the cholesteric liquid crystal, the planar state is changed to a state in which the planar state and the focal conic state coexist and the reflectance is reduced. The amount of decrease in reflectance is determined in accordance with the cumulative time of the pulse.

Like in the case of typical liquid crystals, a cholesteric liquid crystal is driven with an alternating pulse voltage to reduce and/or prevent degradation of a liquid crystal material. Accordingly, a liquid crystal driver IC (a cholesteric liquid crystal IC or an STN liquid crystal IC is commonly used) has a function of changing the polarity of an electric field applied to a liquid crystal cell. Since the liquid crystal driver IC has the function of changing the polarity of an electric field applied to a liquid crystal cell, a single power supply of +36 V may be used as a high-voltage power supply for driving a liquid crystal.

Various driving methods that are performed to display an image on a cholesteric liquid crystal display panel have been proposed, and are classified herein as a non-dynamic driving methods and a dynamic driving method.

Figure 5A:
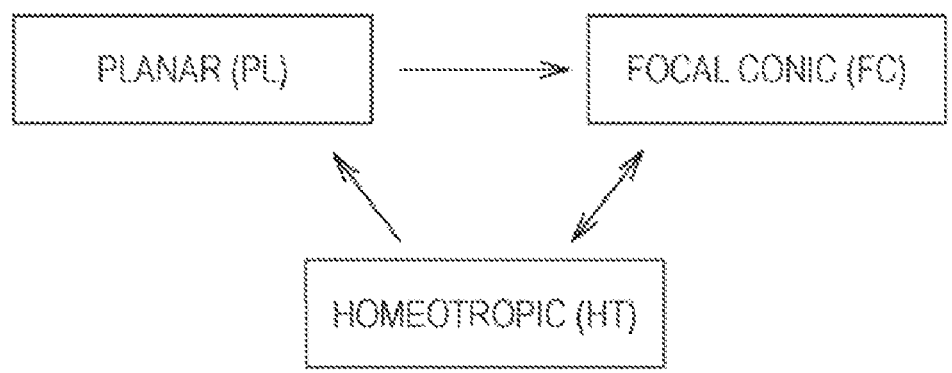
FIG. 5A is a diagram describing the state transition of a cholesteric liquid crystal when a non-dynamic driving method is employed.

As illustrated in FIG. 5A, in the non-dynamic driving method, switching among three states, the homeotropic (HT) state, the planar (PL) state, and the focal conic (FC) state, is controlled by a pulse height and a pulse width in faithful accordance with an operation principle. Since transition to the focal conic state requires a long time, the enhancement of a display speed is a challenge when using non-dynamic driving methods, which has been recognized and considered by the inventors of this application, and is addressed by embodiments described later in this document.

Figure 5B:
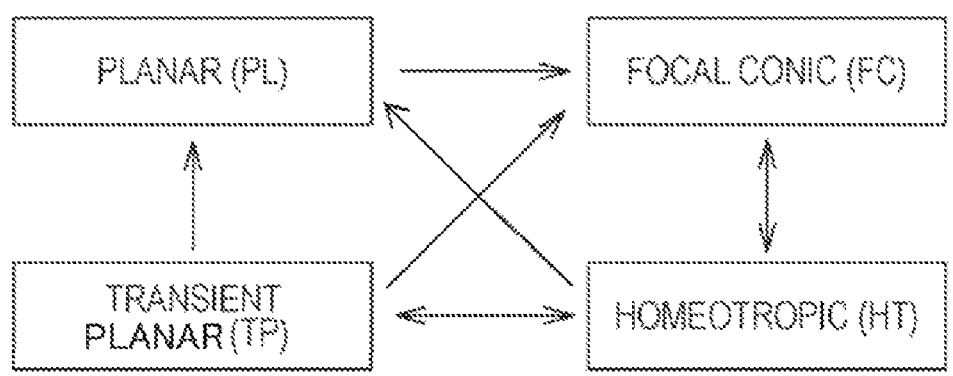
FIG. 5B is a diagram describing the state transition of a cholesteric liquid crystal when a dynamic driving method is employed.

As illustrated in FIG. 5B, in the dynamic driving method, a transient planar (TP) state is used in addition to the above-described three states.

Figure 6A:
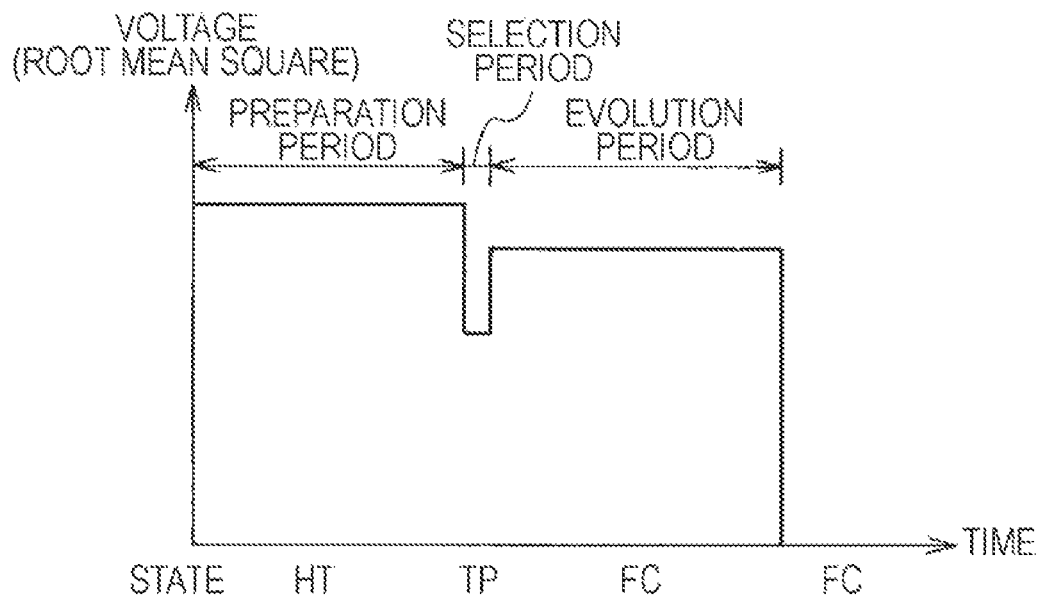
FIG. 6A is a diagram describing a driving voltage used when a black pixel is processed with a dynamic driving method.
Figure 6B:
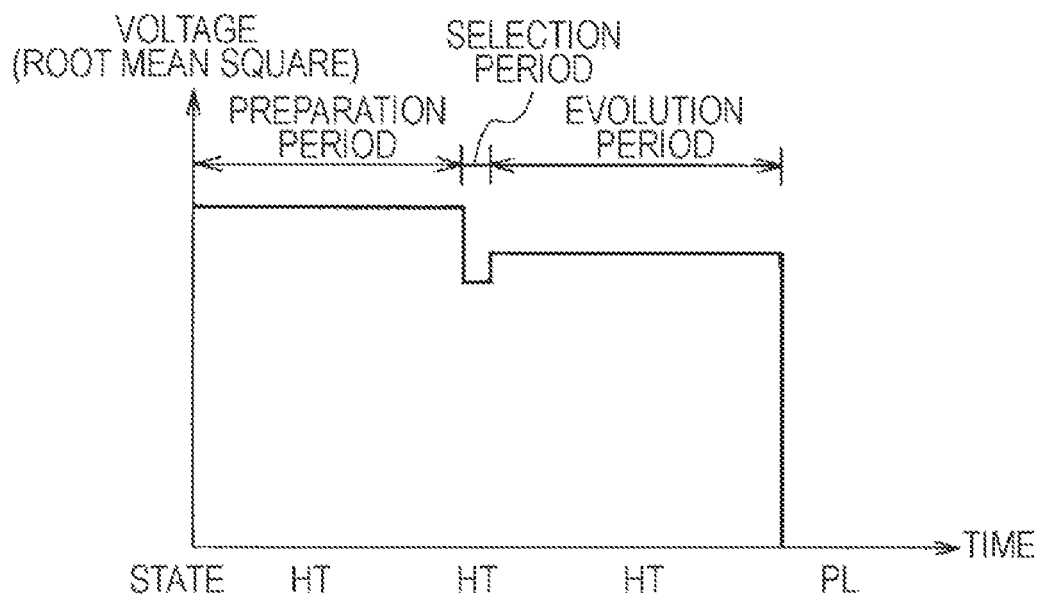
FIG. 6B is a diagram describing a driving voltage used when a white pixel is processed with a dynamic driving method.

FIGS. 6A and 6B illustrate the relationship between the magnitude of an applied voltage and the state of a liquid crystal when the dynamic driving method is used. As illustrated in FIGS. 6A and 6B, in the dynamic driving method, there are a preparation period, a selection period, and an evolution period. In the preparation period, a voltage for bringing a liquid crystal into the homeotropic (HT) state is applied. Subsequently, by applying a low-voltage pulse in the short selection period, it is determined whether the homeotropic state is maintained or the homeotropic (HT) state is changed to the transient planar (TP) state. Subsequently, in the evolution period, a voltage suitable for transition from the planar (PL) state to the focal conic (FC) state is applied. A pixel in the homeotropic (HT) state stays in the state during the evolution state, and is brought into the planar (PL) state, that is, the bright state, after the evolution period has elapsed. A pixel in the transient planar (TP) state is brought into the focal conic (FC) state in the evolution period. The selection period in which one of the planar (PL) state and the focal conic (FC) state is merely selected as a final state is extremely short. A driving waveform for the selection period is applied to all display lines for scanning. The preparation period and the evolution period are set before and after the selection period of each of the display lines, respectively, so that the preparation periods of the display lines overlap each other and the evolution periods of the display lines overlap each other. As a result, it is possible to rewrite one screen in a short time and realize high-speed display. In the dynamic driving method, since the saturation of each of the planar state (bright) and the focal conic state (dark) is low, the improvement of contrast is a challenge, which has been recognized and considered by the inventors of this application, and is addressed by embodiments described later in this document. Furthermore, since the margin of a condition for determining which of the planar state and the focal conic state is set as a final state is narrow, variation in the reflectance of pixels having the same gradation level is a problem, which has also been recognized and considered by the inventors of this application, and is addressed by embodiments described later in this document. Still furthermore, the elimination of the manufacturing error of a panel and the improvement of stability of display (in particular, gradation display) in an ambient temperature are common challenges, which has also been recognized and considered by the inventors of this application, and is addressed by embodiments described later in this document.

Various methods of driving a cholesteric liquid crystal display according to non-dynamic driving methods and/or the dynamic driving method, as well as issues recognized and considered by the inventors of this application are described below.

First, a typical example of the non-dynamic driving method will be described.

Figure 7:
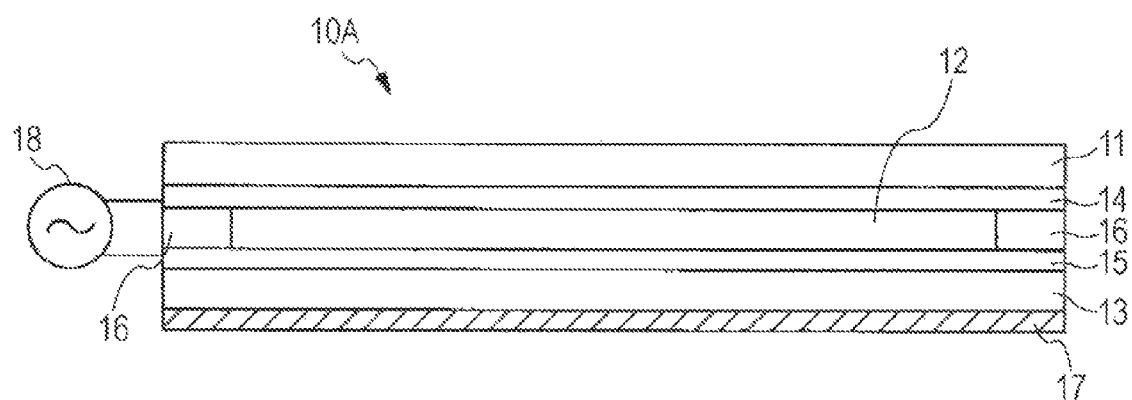
FIG. 7 is a diagram illustrating a structure of a single cholesteric liquid crystal display panel.
Figure 8:
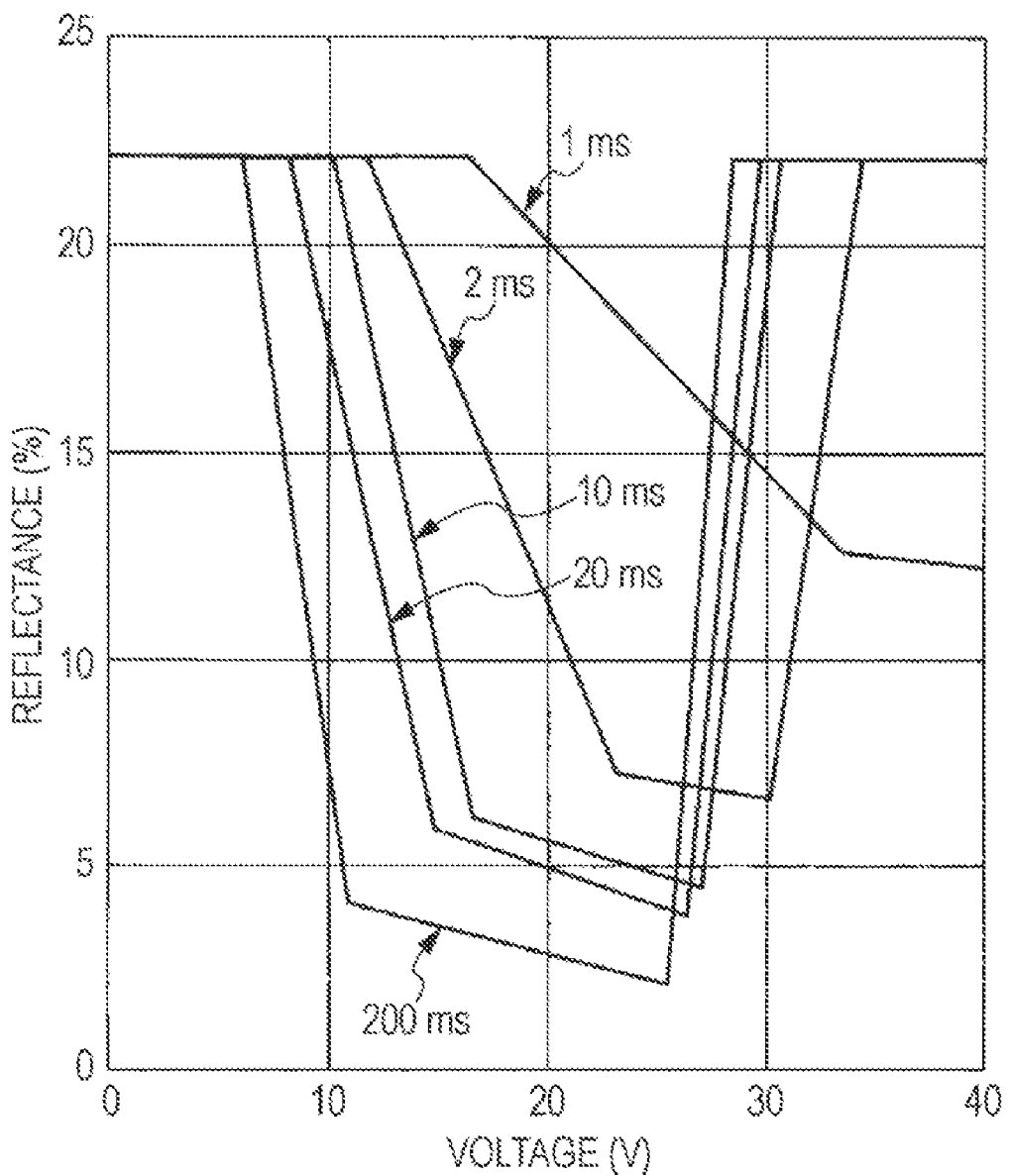
FIG. 8 is a voltage response characteristic diagram illustrating the change in the reflectance (brightness level) of a cholesteric liquid crystal display panel to which a pulse voltage is applied.

A display speed heavily depends on a liquid crystal material and a panel structure. An example case, in which a cholesteric liquid crystal display panel 10A having a structure illustrated in FIG. 7 and a voltage response characteristic illustrated in FIG. 8 is used, will be described below. As illustrated in FIG. 7, the cholesteric liquid crystal display panel 10A includes the upper substrate 11, an upper electrode layer 14 disposed on the surface of the upper substrate 11, the lower substrate 13, a lower electrode layer 15 disposed on the surface of the lower substrate 13, and a sealing material 16. A visible light absorption layer 17 is disposed under (on the outer surface of) the lower substrate 13 on a side opposite a light entering side as necessary.

FIG. 8 is a diagram illustrating the change in a reflectance measured by applying a pulse to the cholesteric liquid crystal display panel 10A in the planar state in which the highest reflectance (brightness) of 22% is obtained. Referring to FIG. 8, a horizontal axis depicts a pulse voltage and a vertical axis depicts a reflectance obtained after application of a pulse. Parameters 1 ms, 2 ms, 10 ms, 20 ms, and 200 ms depict a driving time for each line when a power supply voltage equal to or lower than 36 V is used. The driving time corresponds to a pulse width. That is, FIG. 8 illustrates a response characteristic obtained in a case where the planar state is changed to the focal conic state using a non-dynamic driving method, that is, the area A on the left side of FIG. 2 is used. For example, when a pulse with a pulse width of 1 ms is applied, a reflectance is not changed with a pulse of 15 V and is reduced to 15% or lower with a pulse of 30 V. When a pulse with a pulse width of 200 ms is applied, a reflectance of 4% is obtained with a pulse of 11 V and the reflectance of 22% is obtained with a pulse of 28V that brings the cholesteric liquid crystal display panel 10A back into the planar state.

The following description is base on the above-described characteristic.

In non-dynamic driving methods, the enhancement of a display speed is a challenge, which has been recognized and considered by the inventors of this application. It is possible to perform the transition from the focal conic state to the planar state, that is, the transition using the area B on the right side of FIG. 2, in a relatively short time. In contrast, the transition from the planar state to the focal conic state, that is, the transition using the area A on the left side of FIG. 2, requires comparatively long time. Accordingly, from the viewpoint of a display speed, it is desirable that the transition from the focal conic state to the planar state be mainly used.

As a first example, a driving method will be considered of performing a first procedure of resetting all pixels to the planar state corresponding to white and then applying a low-voltage pulse to white pixels several times to reduce the brightness of these pixels. That is, the first example is a driving method of performing a second procedure of changing the planar state to the focal conic state. In this driving method that is the first example, the area A on the left side of FIG. 2 is used to display gradations including black and the transition from the planar state to the focal conic state having various saturation levels is performed for each line. Since the voltage response characteristic shows a gradual change in the area A, it is possible to display gradations well. However, since it takes at least 10 ms to reduce a brightness level to a certain black level, a display speed is low. If a display panel having 1000 lines is used, a typical time required for display is 10 seconds. Furthermore, since the display of a binary image is not performed at the beginning of the driving method, sufficient blackness (darkness) cannot be obtained and a contrast is slightly low while good gradation continuity can be obtained. Accordingly, in the first example, the achievement of a high contrast is one of challenges. In the first example, a display speed higher than that obtained in a third example to be described later can be obtained, but a contrast is lower than that obtained in the third example.

As a second example, a driving method will be considered of performing the low-speed transition from the planar state to the focal conic state for all pixels at the same time and performing the relatively high-speed transition from the focal conic state to the planar state for each line. This driving method is referred to as a focal conic reset method (hereinafter referred to as a FCR method). If all pixels are changed at the same time, a time allocated for processing a single line is very short. In the FCR method, a typical scanning speed is 1 to 10 ms/line. In the FCR method, it is possible to increase a scanning speed with a higher driving voltage. In order to achieve a scanning speed of 1 ms/line, a high voltage of approximately 100 V is required. It is difficult to obtain a power supply and a driver IC which operate at such a high voltage, and such a power supply and a driver IC are expensive. On the other hand, if a power supply and a driver IC operating at a power supply voltage of 36 V which are easily available are used, a scanning speed is approximately 4 ms/line.

Since the transition from the planar state to the focal conic state is performed for all pixels at the same time, it is possible to take the time to obtain good blackness (high contrast). If a display panel having 1000 lines is used, a time required for scanning these lines at a speed of 4 ms/line is 4 seconds. A time required for achieving a high contrast in the transition from the planar state to the focal conic state is approximately 200 ms. This is sufficiently shorter than the scanning time. Accordingly, a high contrast can be achieved without any time problems.

However, in the FCR method, the area B on the right side of FIG. 2 is used to display gradations and the transition from the focal conic state to the planer state is performed for each line. Since the voltage response characteristic is abruptly changed in the area B, the gradation level is comparatively unstable and nonuniform while good brightness can be obtained in the bright state. Thus, the FCR method lacks the reproducibility of gradations.

As a third example, a driving method will be considered of performing a first procedure of displaying a binary image using the area B on the right side of FIG. 2 and then performing a second procedure of applying a low-voltage pulse with a narrow width to pixels in the planar state corresponding to a bright state several times using the area A on the left side of FIG. 2 to reduce the brightness level of these pixels. Using this driving method, it is possible to stabilize a brightness level and uniformly display gradations. However, in this driving method, the transition from the planar state to the focal conic state having various saturation levels is performed for each line using the area A on the left side of FIG. 2. Since the voltage response characteristic is gradually changed in the area A on the left side of FIG. 2, it is possible to display gradations well. However, this driving method requires at least 20 ms to reduce a brightness level to a level close to black and thus, the display speed is low. If a display panel having 1000 lines is used and the first procedure is performed using the FCR method, it typically takes 4 seconds to display a binary image in the first procedure and 20 seconds to display gradations in the second procedure, that is, 24 seconds in total to perform the driving method.

As a modification of the third example, a driving method will be considered of performing a first procedure of displaying a plurality of gradation levels using the area B and then performing a second procedure of changing these displayed gradation levels to other gradation levels using the area A. In this driving method, however, since a gradation level close to black is further reduced in the second procedure, a display speed is also low like in the third example.

Although typical examples of a non-dynamic driving method have been described, a display speed is low in all of these examples.

As a fourth example, the above-described dynamic driving method will be considered. In the dynamic driving method, the planar state or the focal conic state is set for each line as a final state using the area B on the right side of FIG. 2. In the dynamic driving method, without waiting for the completion of setting the final state of pixels included in each line, the next line is processed. The selection period required for setting is approximately 1 ms. If a display panel having 1000 lines is used, a typical time required for display is 1 second.

When the dynamic driving method is used, the saturation levels of the bright state and the dark state are low in both of the planar state and the focal conic state. Accordingly, the achievement of a high contrast is a challenge, which has been recognized and considered by the inventors of this application. Furthermore, since the margin of a condition for determining which of the planar state and the focal conic state is set as a final state is narrow, the elimination of a manufacturing error of a panel and the improvement of stability of display (in particular, gradation display) in an ambient temperature are also challenges, which have been recognized and considered by the inventors of this application.

As a fifth example, a driving method using the dynamic driving method and the non-dynamic driving method in combination will be considered. In the fifth example, after a binary image with a relatively low contrast has been displayed using the dynamic driving method, overwriting is performed using a non-dynamic driving method. As a result, it is possible to achieve a high contrast, display gradations, and remove a display error. In the non-dynamic driving method, since it requires at least 20 ms to reduce a brightness level to a level close to black using the area A on the left side of FIG. 2, the enhancement of a display speed is a challenge. If a display panel having 1000 lines is used, it typically takes 1 second to display a binary image, 20 seconds to display gradations, that is, 21 seconds in total to perform this driving method.

FIG. 9 illustrates a table detailing the characteristics of the above-described examples. Display times in the table are typical values obtained by trial calculation.

As illustrated in FIG. 9, a time required for display is long, for example, 10 to 24 seconds. The most popular use for electronic paper is currently as electronic books, personal digital assistants, etc. In these devices, display is expected to be performed at a high display speed (rewriting speed) of 1 to 2 seconds. Accordingly, in order to satisfy this need, the dynamic driving method is currently used. However, since the gradation display capability of the dynamic driving method is insufficient, the number of displayable colors is limited to 8 to 64 colors.

If a full-color display panel having 1000 lines is used as described previously, it takes 10 seconds to display a relatively low-contrast image and 20 seconds or more to display a high-contrast image. The display speed is considered important for applying a cholesteric liquid crystal display panel to electronic books, personal digital assistants, etc.

Next, a display apparatus provided with a cholesteric liquid crystal display panel according to an embodiment of the present invention that is different from the above-described examples will be described. It is noted that the above-discussed issues and challenges associated with the previously described examples have been recognized by the inventors of this application and the following embodiments mitigate and/or address the above described issues and challenges.

A display apparatus according to an embodiment of the present invention includes a cholesteric liquid crystal display panel capable of performing multi-gradation display, a driving circuit for the cholesteric liquid crystal display panel, and a control circuit. In this display apparatus, the control circuit classifies pixels into a group for the highest brightness level, that is, the highest gradation level, a group for the lowest brightness level, that is, the lowest gradation level, at least one group for a low intermediate gradation level close to the lowest gradation level, and a group for a high intermediate gradation level between the highest gradation level and the low intermediate gradation level in accordance with a gradation level to be displayed. The driving circuit applies a first driving waveform to the cholesteric liquid crystal display panel so as to bring pixels belonging to the group for the highest gradation level and the group for a high intermediate gradation level into a state corresponding to the highest gradation level, pixels belonging to the group for the lowest gradation level into a state corresponding to the lowest gradation level, and pixels belonging to the group for a low intermediate gradation level into states corresponding to gradation levels to be displayed. Furthermore, the driving circuit applies a second driving waveform to the cholesteric liquid crystal display panel so as to bring the pixels belonging to the group for a high intermediate gradation level into states corresponding to gradation levels to be displayed.

A display apparatus according to an embodiment of the present invention uses a three-layer RGB color cholesteric liquid crystal display panel with the highest degree of color reproducibility.

Figure 10:
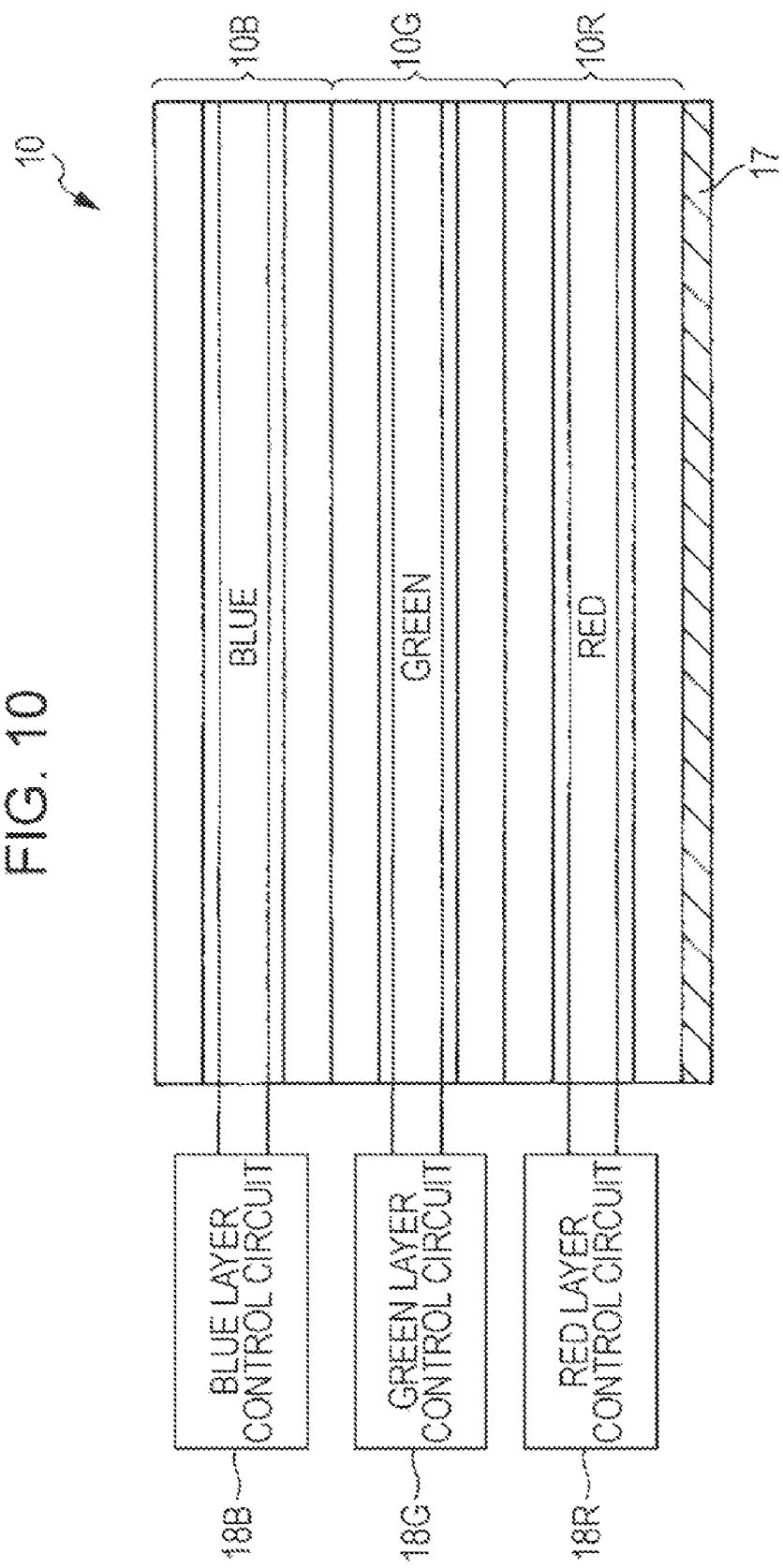
FIG. 10 is a diagram illustrating a layered structure of a cholesteric liquid crystal display panel included in a color display apparatus according to an embodiment of the present invention.

FIG. 10 is a diagram illustrating a structure of a three-layer RGB color cholesteric liquid crystal display panel according to an embodiment of the present invention. As illustrated in FIG. 10, in the display panel 10, three panels, a blue panel 10B, a green panel 10G, and a red panel 10R, are layered from a viewing side. A light absorption layer 17 is provided under the red panel 10R. Although the panels 10B, 10G, and 10R have the same structure as that of the panel 10A illustrated in FIG. 7 except for the light absorption layer 17, they have different wavelength characteristics. Liquid crystal materials and chiral materials are selected and the contents of the chiral materials are determined so that the center wavelength of the reflection of the blue panel 10B corresponds to blue (approximately 480 nm), the center wavelength of the reflection of the green panel 10G corresponds to green (approximately 550 nm), and the center wavelength of the reflection of the red panel 10R corresponds to red (approximately 630 nm). The panels 10B, 10G, and 10R are driven by a blue layer control circuit 18B, a green layer control circuit 18G, and a red layer control circuit 18R, respectively.

The structure of each of these panels will be described with reference to FIG. 7. As illustrated in FIG. 7, the cholesteric liquid crystal display panel includes the upper substrate 11, the upper electrode layer 14 disposed on the surface of the upper substrate 11, the lower substrate 13, the lower electrode layer 15 disposed on the surface of the lower substrate 13, and the sealing material 16. The visible light absorption layer 17 is disposed under (on the outer surface of) the lower substrate 13 on a side opposite a light entering side as necessary.

The upper substrate 11 and the lower substrate 13 are disposed so that electrodes face each other. A liquid crystal material is filled between these electrodes and is then sealed by the sealing material 16. Although spacers are disposed in the liquid crystal layer 12, the illustration thereof is omitted. A voltage pulse signal is transmitted to the electrodes of the upper electrode layer 14 and the lower electrode layer 15 from a driving circuit 18. As a result, a voltage is applied to the liquid crystal layer 12. The liquid crystal layer 12 is composed of a cholesteric liquid crystal composition indicating a cholesteric phase. By applying a voltage to the liquid crystal layer 12, the liquid crystal molecules in the liquid crystal layer 12 are brought into the planar state or the focal conic state so as to perform display processing.

Both of the upper substrate 11 and the lower substrate 13 are light-transmissive. While an example of a light-transmissive substrate is a glass substrate, a film substrate of polyethylene terephthalate (PET), polycarbonate (PC), or the like may be used.

While a representative example of the material for the electrodes of the upper electrode layer 14 and the lower electrode layer 15 is indium tin oxide (ITO), a transparent conductive film of indium zinc oxide (IZO) or the like may be used.

The transparent electrodes of the upper electrode layer 14 are formed on the upper substrate 11 as a plurality of strip-shaped upper transparent electrodes parallel to one another. The transparent electrodes of the lower electrode layer 15 are formed on the lower substrate 13 as a plurality of strip-shaped lower transparent electrodes parallel to one another. The upper substrate 11 and the lower substrate 13 are disposed so that the upper electrodes and the lower electrodes intersect with each other when viewed from a direction perpendicular to a planar surface of the substrates. Pixels are formed at the intersections.

An insulating thin film is formed on the electrodes. When this thin film is thick, a driving voltage is required to be increased. It is therefore difficult to form the driving circuit with a general-purpose STN driver. In contrast, when no thin film is formed, a leakage current increases and power consumption therefore increases. In this example, since the relative dielectric constant of the thin film is approximately 5 that is considerably lower than that of the liquid crystal, it is appropriate that the thickness of the thin film be 0.3 μm or less.

The insulating thin film may be realized by a $SiO_2$ thin film or an organic film of polyimide resin, acrylic resin or the like known as an alignment stabilization film.

Next, the spacers will be described. As described previously, the spacers are disposed in the liquid crystal layer 12 so that the distance between the upper substrate 11 and the lower substrate 13, that is, the thickness of the liquid crystal layer 12, is uniform. While spacers are typically spheres made of a resin or an inorganic oxide, adhesive spacers obtained by coating the surface of a substrate with a thermoplastic resin may be used. It is appropriate that a cell gap formed by the spacers be in a range of 3.5 μm to 6.0 μm, for example. When the cell gap is less than the range, the reflectance is reduced to make the display dark. When the cell gap is greater than the range, the driving voltage is increased to make driving by a general-purpose driver difficult.

The liquid crystal composition forming the liquid crystal layer 12 is a cholesteric liquid crystal. The cholesteric liquid crystal is obtained by adding a chiral material to a nematic liquid crystal mixture so that the addition amount ranges from 10 wt % to 40 wt %. Here, the addition amount of the chiral material is a value obtained under the condition that the total amount of a nematic liquid crystal component and the chiral material is 100 wt %.

While various known nematic liquid crystals may be used, according to an embodiment, a liquid crystal material with a dielectric anisotropy ($\Delta\in$) falling within the range of 15 to 35 is used. When the dielectric anisotropy is 15 or lower, the driving voltage is increased and a general-purpose driver therefore cannot be used for the driving circuit. On the other hand, when the dielectric anisotropy is 15 or higher, the ratio $V^2T$ between a total selection voltage and a half selection voltage is increased, which may cause a problem with reliability of the liquid crystal material itself.

According to an embodiment, the refractive index anisotropy ($\Delta n$) of the liquid crystal material falls within the range of 0.18 to 0.26. When the refractive index anisotropy is less than the range, a reflectance is low in the planar state. When the refractive index anisotropy is greater than the range, a diffuse reflectance is high in the focal conic state and a viscosity is high, which may lead to the reduction in a response speed.

A three-layer RGB color cholesteric liquid crystal display panel according to an embodiment of the present invention has been described above, but an embodiment of the present invention is not limited thereto.

FIG. 11 is a diagram illustrating an example configuration of a display apparatus according to an embodiment of the present invention. The RGB color cholesteric liquid crystal display panel 10 may be an A4-size display panel achieving the XGA resolution, and has 1024 pixels×768 pixels. A power source 21 outputs a voltage of, for example, 3 V to 5 V. A boosting unit 22 raises a voltage input from the power source 21 to 36 V to 40 V using a regulator such as a DC-DC converter. As the boosting regulator, a dedicated IC may be used. The IC has a function of adjusting a boosted voltage by setting a feedback voltage. Accordingly, the boosted voltage may be changed by selecting a plurality of voltages generated by voltage division performed by resistors and supplying them to a feedback terminal.

A voltage switching unit 23 generates various voltages by resistance division or the like. While a high-voltage analog switch may be used for the switching between a reset voltage and a gradation writing voltage performed by the voltage switching unit 23, a simple switching circuit formed by a transistor may be used. A voltage stabilization unit 24 may use a voltage follower circuit of an operational amplifier to stabilize various voltages supplied from the voltage switching unit 23. An operational amplifier resistant to a capacitive load may be used. A configuration of changing an amplification factor by changing a resistor connected to the operational amplifier is widely known. By using this configuration, it is possible to easily change a voltage output from the voltage stabilization unit 24.

A master clock unit 25 generates a basic clock on the basis of which an operation is performed. A frequency division unit 26 divides the basic clock so as to generate various clocks used for procedures to be described later.

A control circuit 27 generates a control signal on the basis of the basic clock, various clocks, and image data D, and supplies the control signal to a common driver 28 and a segment driver 29.

Major control signals are as follows:

LP_COM: Shift clock signal for line selection data (common driver). LCD drive signals change at the trailing edge of the LP_COM.
XSCL: Shift clock signal for display data (segment driver).
DIO: Cascading control signal for line selection data and/or display data.
FR: Polarity selection signal.
LP_SEG: Latch signal for display data.
DSPOF: Output disable signal for LCD drive signals.
IMAGE_DATA: Display data input (segment driver).

The common driver 28 drives 768 scanning lines, for example. The segment driver 29 drives 1024 data lines, for example. Since different pieces of image data are supplied to R, G, and B pixels, the segment driver 29 independently drives the data lines. The common driver 28 drives R, G, and B lines in common. In this embodiment, a general-purpose STN driver with 4 output voltages (2 output voltages in the positive phase and the other 2 output voltages in the negative phase) is used as the driver IC. However, various drivers may be used as the driver IC.

FIGS. 12A and 12B are diagrams describing voltages output from the common driver 28 and the segment driver 29. The operations of these drivers will be described using a voltage applied in a second procedure to be described later.

The segment driver 29 and the common driver 28 individually output, for example, pulses illustrated in FIG. 12A. By applying these pulses to the display panel 10, voltages illustrated in FIG. 12B are applied to pixels.

To the segment driver 29, 20 V is supplied as V0 and 10 V is supplied as V21S and V34S. The segment driver 29 outputs a positive pulse in a positive phase (FR=1) and a negative pulse in a negative phase (FR=0).

To the common driver 28, 20 V is supplied as V0, 15 V is supplied as V21C, and 5 V is supplied as V34C. The common driver 28 outputs a negative pulse in the positive phase (FR=1) and a positive pulse in the negative phase (FR=0).

When the pulses illustrated in FIG. 12A are applied to the display panel 10, the following voltage differences measured from scanning line (scanning line: 0V) are applied to pixels. When the scanning lines are in a selected state (common is ON) and the data lines are also in the selected state (segment is ON), 20 V is applied in the positive phase (FR=1) and −20 V is applied in the negative phase (FR=0). When the scanning lines are in the selected state (common is ON) and the data lines are in a non-selected state (segment is OFF), 10 V is applied in the positive phase (FR=1) and −10 V is applied in the negative phase (FR=0). When the scanning lines are in the non-selected state (common is OFF) and the data lines are in the selected state (segment is ON), 5 V is applied in the positive phase (FR=1) and −5 V is applied in the negative phase (FR=0). When the scanning lines are in the non-selected state (common is OFF) and the data lines are in the non-selected state (segment is OFF), −5 V is applied in the positive phase (FR=1) and 5 V is applied in the negative phase (FR=0).

Figure 13A:
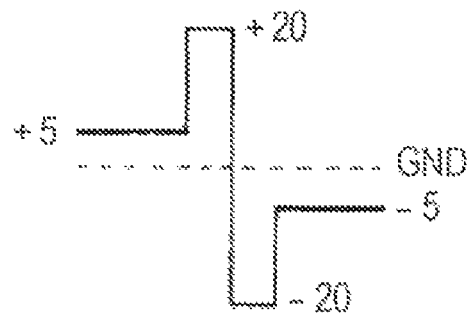
FIG. 13A is a diagram illustrating example waveforms of voltage pulses applied to each pixel on a scanning line in a selected state.
Figure 13B:
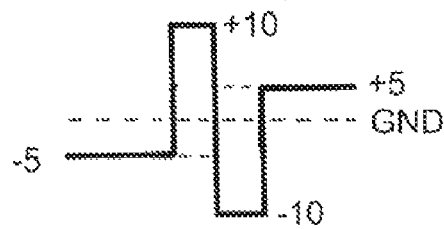
FIG. 13B is a diagram illustrating example waveforms of voltage pulses applied to each pixel on a scanning line in a non-selected state.

Accordingly, the waveform of a voltage pulse applied to each pixel on a scanning line in the selected state is as illustrated in FIG. 13A, and the waveform of a voltage pulse applied to each pixel on a scanning line in the non-selected state is as illustrated in FIG. 13B. In both cases, the waveform of a data line in the selected state is represented by a solid line, and the waveform of a data line in the non-selected state is represented by a dotted line. In the case of a voltage pulse with a pulse width of 2 ms, the state of the liquid crystal, that is, the reflectance, is changed when the voltage is ±20 V, and the reflectance is not changed when the voltage is ±10 V. Therefore, if the above-described waveforms are used, writing is performed with a gradation pulse when both of the scanning lines and the data lines are ON. In other cases, writing is not performed. In reality, there is a problem of crosstalk. However, since the problem is not directly related to the present invention, the description thereof will be omitted.

While the waveforms of the voltage pulses actually applied in the second procedure are as illustrated in FIGS. 13A and 13B as described previously, the waveforms are sometimes expressed as positive and negative pulses symmetrical with respect to 0 V in the following description for simplification of explanation. Furthermore, the voltage of an OFF pulse is set to a level at which no writing is performed. A pulse voltage indicates the voltage of an ON pulse.

A configuration of a display apparatus according to an embodiment of the present invention has been described.

Next, an image writing process performed by a display apparatus according to a first embodiment of the present invention will be described.

Figure 14:
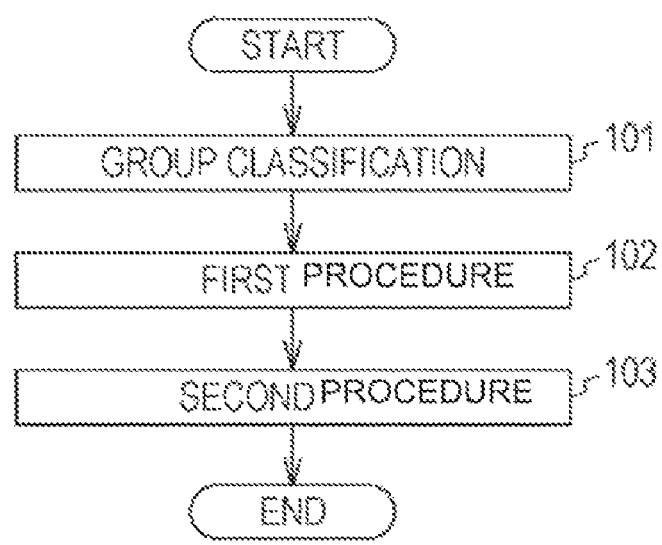
FIG. 14 is a flowchart illustrating a writing process performed by a display apparatus according to a first embodiment of the present invention.
Figure 15:
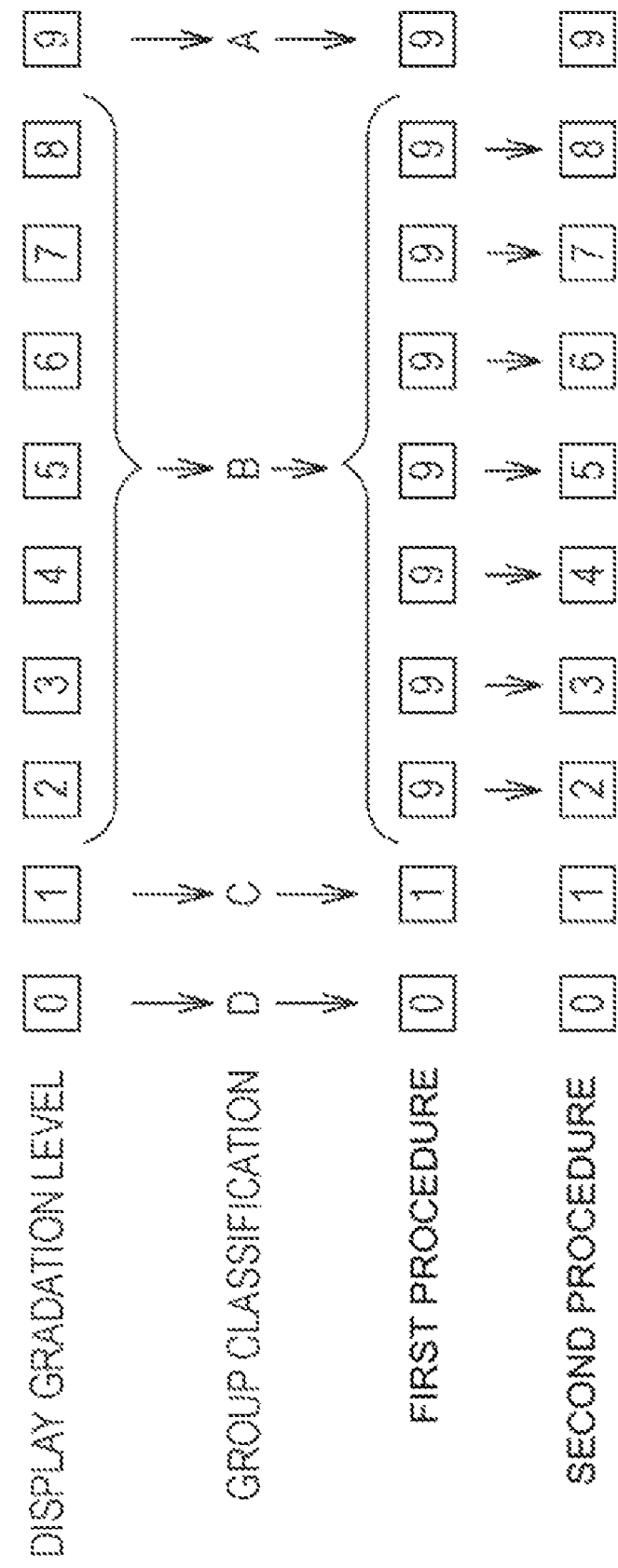
FIG. 15 is a diagram describing processing according to the first embodiment performed for each gradation level.

FIG. 14 is a flowchart illustrating a writing process performed by a display apparatus according to the first embodiment of the present invention. FIG. 15 is a diagram describing processing according to the first embodiment performed for each gradation level.

As illustrated in FIG. 14, a wiring process according to the first embodiment includes a group classification procedure 101, a first procedure 102, and a second procedure 103.

As illustrated in FIG. 15, it is assumed that 10-gradation-level (0 to 9) display data is used. The 10-gradation-level display data may be originally obtained 10-gradation-level display data, or may be data obtained by performing gradation level reduction processing upon 16-gradation-level display data or 256-gradation-level display data, for example. In this example, a gradation level 9 is the highest gradation level, and a gradation level 0 is the lowest gradation level.

In the group classification procedure 101, a pixel having the gradation level 9 is put in a group A for the highest gradation level, a pixel having one of seven gradation levels from the gradation level 2 to the gradation level 8 is put in a group B for a high intermediate gradation level, a pixel having the gradation level 1 is put in a group C for a low intermediate gradation level, and a pixel having the gradation level 0 is put in a group D for the lowest gradation level.

In the first procedure 102, writing processing is performed using the dynamic driving method so that pixels belonging to the groups A and B are brought into the gradation level 9, pixels belonging to the group C are brought into the gradation level 1, and pixels belonging to the group D are brought into the gradation level 0. Accordingly, a large number of liquid crystal molecules of the pixels belonging to the groups A and B are brought into the planar state, and a large number of liquid crystal molecules of the pixels belonging to the group D are brought into the focal conic state. The pixels belonging to the group C are brought into a state in which liquid crystal molecules in the focal conic state and a small number of liquid crystal molecules in the planar state are mixed. In this example, the ratio of liquid crystals in the planar state to all liquid crystals is referred to as a mixture ratio.

In the second procedure 103, writing processing is performed using a non-dynamic driving method so that the state of each of the pixels belonging to the group B is changed from the gradation level 9 to any one of the gradation levels 2 to 8 corresponding to a gradation level to be displayed.

Figure 16:
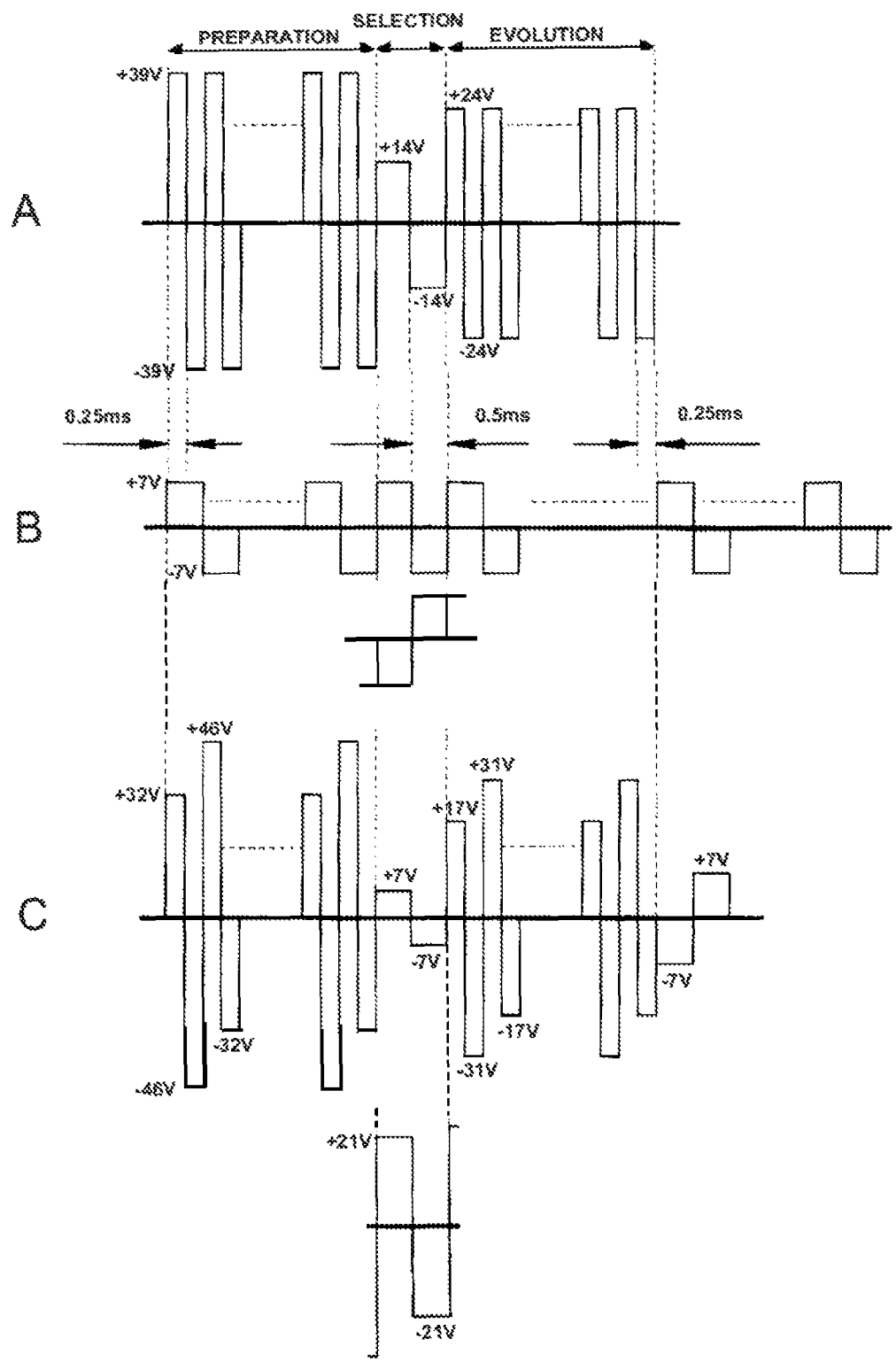
FIG. 16 is a diagram illustrating a dynamic driving waveform used in a first procedure according to the first embodiment.

FIG. 16 is diagrams describing the dynamic driving method used in the first procedure 102. A of FIG. 16 illustrates the waveform of a voltage output from the common driver 28, B of FIG. 16 illustrates the waveform of a voltage output from the segment driver 29, and C of FIG. 16 illustrates the waveform of a voltage applied to a liquid crystal. As described previously, the dynamic driving method includes the preparation period, the selection period, and the evolution period. Root mean square (rms) voltages and time lengths applied to liquid crystal pixels in the preparation period, the selection period, and the evolution period are 39.6V rms/60 ms, 21V or 7V/1 ms, and 25 V rms/20 ms, respectively.

Figure 17:
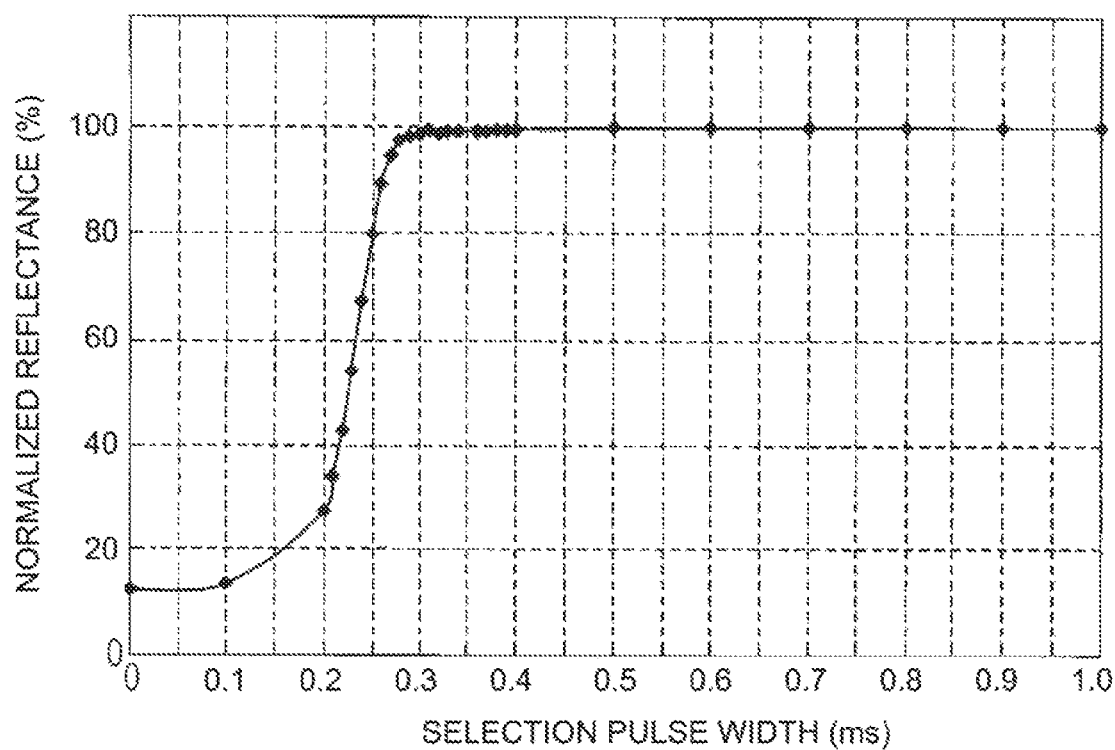
FIG. 17 is a diagram illustrating the relationship between the pulse length of a dynamic driving waveform applied in the first procedure according to the first embodiment and a reflectance.

FIG. 17 is a diagram illustrating the change in a reflectance when a pulse length in the selection period is changed by changing the duty ratio of the pulse in the selection period in the voltage waveform illustrated in FIG. 16. As illustrated in the drawing, when a pulse length is shorter than 0.1 ms, a reflectance is low. When a pulse length is longer than 0.3 ms, a reflectance is high. When a pulse length falls within the range of 0.1 ms to 0.3 ms, a reflectance achieving gradation display is obtained. In the first embodiment, a waveform with a pulse width of 0 ms, that is, a waveform including no selection period, is applied to pixels having the gradation level 0 so that a normalized reflectance is 12% (=the minimum value) of the maximum value. A waveform with a pulse width of 0.16 ms is applied to pixels having the gradation level 1 so that a reflectance is 20.8% of the maximum value. A waveform with a pulse width of 1 ms is applied to pixels having the gradation level 9 so that the maximum value of a reflectance is obtained. A time required for the first procedure is approximately 1 second.

Figure 18:
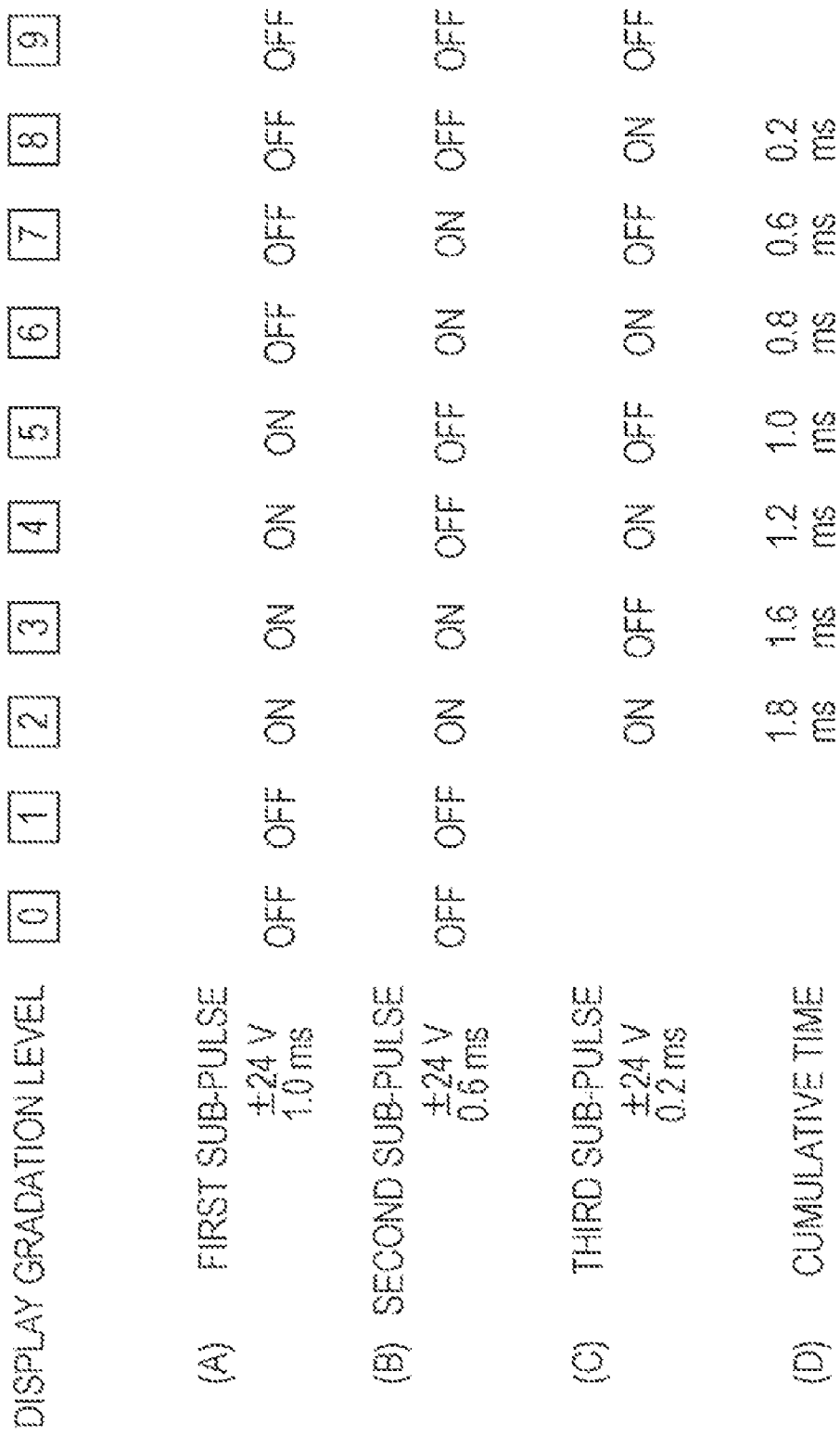
FIG. 18 is a diagram describing a non-dynamic driving method used in a second procedure according to the first embodiment.

FIG. 18 is a diagram describing a non-dynamic driving method used in the second procedure 103. In the second procedure 103, by performing the application of pulses with the voltage waveforms illustrated in FIG. 4, the pixels belonging to the group B and changed to the gradation level 9 in the first procedure 102 are processed so as to have gradation levels 2 to 8 to be displayed. In the non-dynamic driving method, the change in reflectance is related to the cumulative time of pulse application. Accordingly, in the second procedure 103, scanning (A) using a first sub-pulse of ±24 V with a width of 1 ms, scanning (B) using a second sub-pulse of ±24 V with a width of 0.6 ms, and scanning (C) using a third sub-pulse of ±24 V with a width of 0.2 ms are performed. As illustrated in FIG. 18, the pixels having the gradation level 2 are brought into the ON state by all of the first to third sub-pulses, and the cumulative time of pulse application is 1.8 ms. The pixels having the gradation level 3 is brought into the ON state by the first and second sub-pulses and the OFF state by the third pulse, and the cumulative time of pulse application is 1.6 ms. The pulse application cumulative times of the pixels having the gradation level 4, the pixels having the gradation level 5, the pixels having the gradation level 6, the pixels having the gradation level 7, and the pixels having the gradation level 8 are 1.2 ms, 1.0 ms, 0.8 ms, 0.6 ms, and 0.2 ms, respectively. Consequently, a pixel having each of these gradation levels has a corresponding reflectance (brightness level). A time required for the second procedure is approximately 1.8 seconds. Accordingly, a total time duration for the first and second procedures, that is, a time duration for writing, is 2.8 seconds.

Here, a rewriting time and display quality according to the first embodiment will be described.

The dynamic driving method achieves high-speed driving, but the highest gradation level corresponding to a bright state and the lowest gradation level corresponding to a dark state may be insufficient. On the other hand, in a non-dynamic driving method using the area B on the right side of FIG. 2, high-speed driving may be achieved, and it is possible to obtain the lowest gradation level corresponding to a sufficiently dark state since it is possible to take a long time to obtain the lowest gradation level. Thus, high-speed driving may be achieved in the dynamic driving method and the non-dynamic driving method using the area B on the right side of FIG. 2, and the lowest gradation level corresponding to a sufficiently dark state may be obtained in the non-dynamic driving method. However, an image obtained with the dynamic driving method and the non-dynamic driving method using the area B on the right side of FIG. 2 may have large variations in a gradation level.

Therefore, as described previously, a method is considered of setting pixels having the lowest gradation level as pixels having the lowest gradation level and the other pixels as pixels having the highest gradation level using the dynamic driving method and the non-dynamic driving method using the area B on the right side of FIG. 2 and changing the gradation levels of pixels other than pixels originally having the lowest gradation level and the highest gradation level from the highest gradation level to corresponding gradation levels using the non-dynamic driving method using the area A on the left side of FIG. 2. According to this method, a pixel that originally has a gradation level close to the lowest gradation level and is set as a pixel having the highest gradation level is processed so as to have a corresponding gradation level using the non-dynamic driving method using the area A on the left side of FIG. 2. However, this requires a very long time. For example, a time duration for changing the gradation level of a pixel from the highest gradation level to a gradation level close to the lowest gradation level is several times as long as a time required for changing the gradation level of a pixel from the highest gradation level to a gradation level substantially intermediate between the highest gradation level and the lowest gradation level.

In the first embodiment, since a pixel having a gradation level close to the lowest gradation level requires a long writing time when the non-dynamic driving method using the area A is employed, writing is performed upon the pixel using the dynamic driving method. Since writing may be performed upon pixels having the other gradation levels in a relatively short time employing the non-dynamic driving method using the area A, writing is performed upon these pixels using the non-dynamic driving method. As a result, the writing time may be shortened.

Furthermore, the variation in a gradation level close to the lowest gradation level written by the dynamic driving is slightly smaller than the variation in a gradation level substantially intermediate between the highest gradation level and the lowest gradation level. Still furthermore, the sensitivity of human eyes to graininess is reduced at a level close to black (the lowest gradation level). Therefore, even if variations in a dark gradation level close to the lowest gradation level written by the dynamic driving occur and the lack of graininess occurs, this does not have a great influence on display.

Accordingly, in a case where the first procedure is performed using a non-dynamic driving method using the area B on the right side of FIG. 2 instead of the dynamic driving method, it is also possible to achieve high-speed processing and obtain a similar effect. Description thereof will be made later.

Next, a display apparatus according to a second embodiment of the present invention will be described. A display apparatus according to the second embodiment is the same as a display apparatus according to the first embodiment except that the display apparatus according to the second embodiment performs pseudo gradation processing (digital halftoning) upon a signal and image data input into the control circuit 27.

Figure 19:
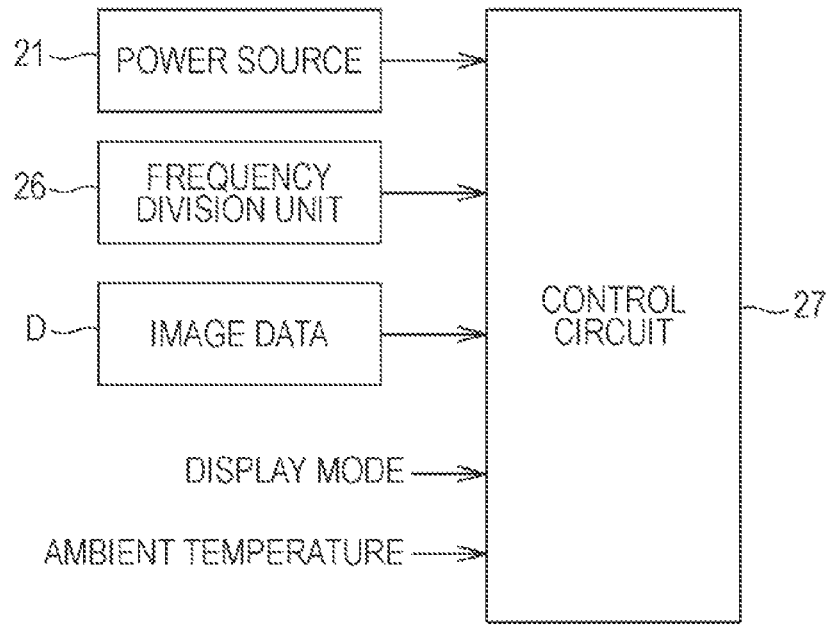
FIG. 19 is a diagram illustrating a signal input into a control circuit included in a display apparatus according to a second embodiment of the present invention.

FIG. 19 is a diagram illustrating inputs into the control circuit 27 included in a display apparatus according to the second embodiment.

As illustrated in FIG. 19, the control circuit 27 included in a display apparatus according to the second embodiment differs from a control circuit included in a display apparatus according to the first embodiment in that a display mode signal and ambient temperature data are input into the control circuit 27.

Figure 20:
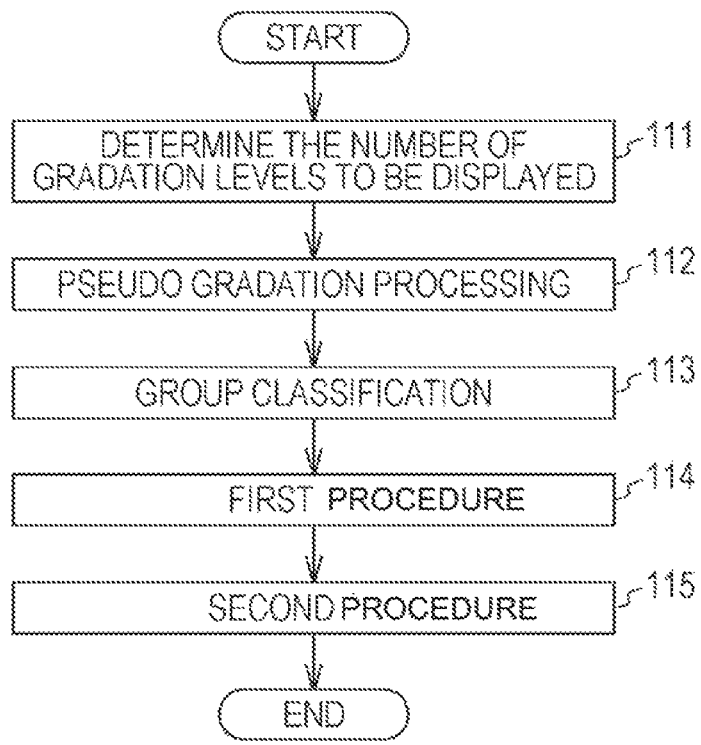
FIG. 20 is a flowchart illustrating a writing process performed by a display apparatus according to the second embodiment.
Figure 21:
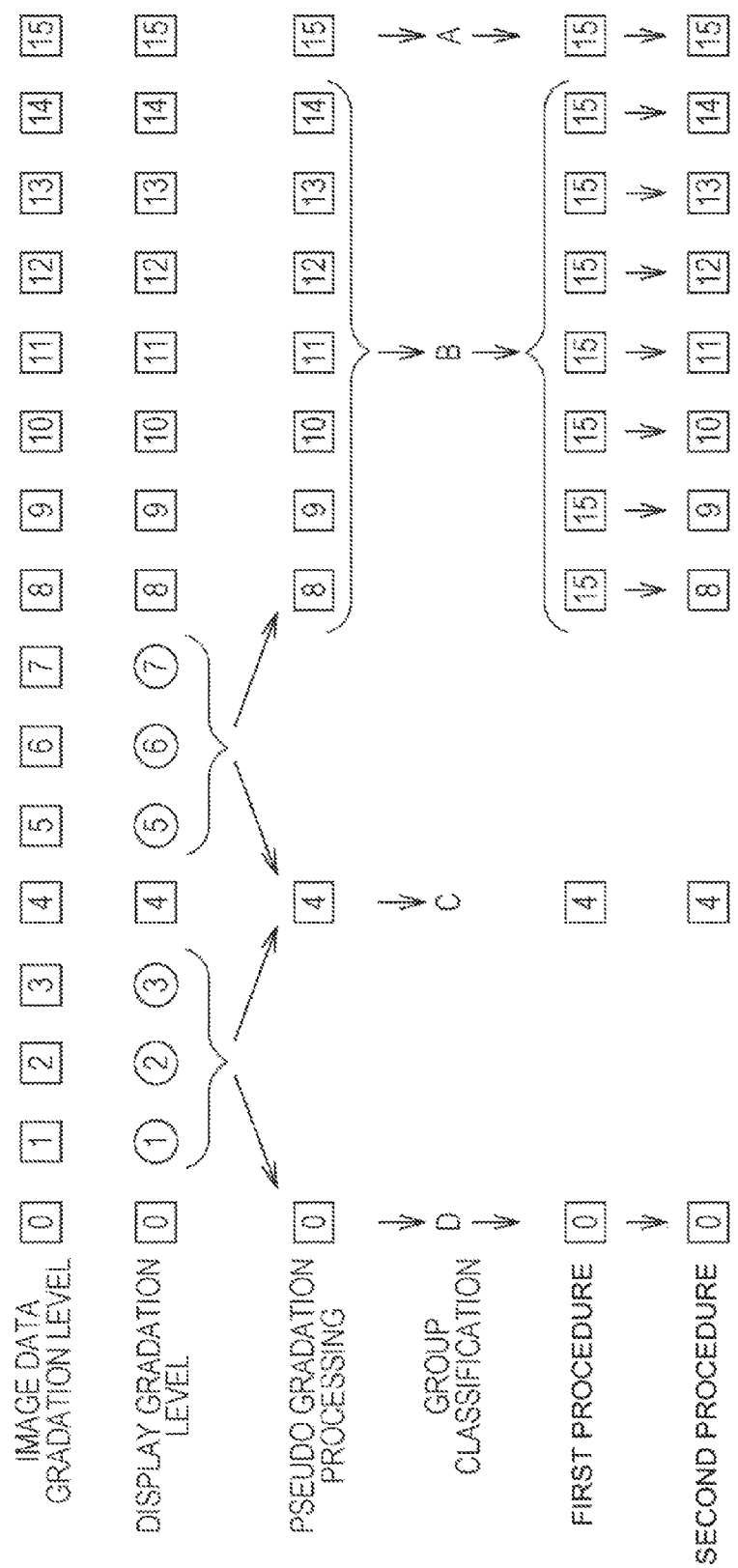
FIG. 21 is a diagram describing processing performed for each gradation level according to the second embodiment.

FIG. 20 is a flowchart illustrating a writing process performed by a display apparatus according to the second embodiment. FIG. 21 is a diagram describing processing performed for each gradation level according to the second embodiment.

As illustrated in FIG. 20, a writing process according to the second embodiment includes a procedure 111 of determining the number of gradation levels to be displayed, a pseudo gradation processing procedure 112, a group classification procedure 113, a first procedure 114, and a second procedure 115.

As illustrated in FIG. 21, there is 16-gradation-level (0 to 15) display data. In the display gradation level number determination procedure 111, it is determined whether each of fifteen gradation levels should be displayed on the basis of the display mode signal and the ambient temperature data. Description thereof will be made later. Here, it is assumed that the gradation levels 0, 4, 8 to 15, ten gradation levels in total, are displayed and the gradation levels 1 to 3 and 5 to 7, six gradation levels in total, are not displayed. The number of gradation levels of original image data is generally 256. The conversion of the display data with 256 gradation levels into display data with 16 gradation levels may be performed by an external apparatus using the multivalued dither method and the multivalued error diffusion method and the display data with 16 gradation levels may be supplied to a display apparatus. Alternatively, the display apparatus may perform the conversion.

Since the darkest gradation level among gradation levels, each of which is changed from the gradation level 15 to a certain gradation level and is then written in the second procedure 115, is the gradation level 8, the gradation levels 0 to 7 are represented by mixing the gradation level 0 or 4 written in the first procedure 114 and the gradation level 8 written in the second procedure 115 in the pseudo gradation processing.

There are various pseudo gradation processing operations. Here, the ordered dither method using a dither matrix of 2 dots×2 dots is employed. Representative dither matrixes include a Bayer-type dither matrix illustrated in FIG. 22A and a spiral-type dither matrix illustrated in FIG. 22B. Here, a Bayer-type dither matrix is used.

FIG. 23 is a diagram illustrating the representation of sets of 2 dots×2 dots the average gradation level of which is 0 to 7.

In the case of a pixel, the value of which falls within the range of the gradation levels 0 to 3, if the pixel has (0, 0) as the least significant bit of the address (X, Y) thereof, the pixel is associated with an element at the upper left corner of the dither matrix. If the pixel has (1, 1) as the least significant bit of the address (X, Y) thereof, the pixel is associated with an element at the lower right corner of the dither matrix. Display at an average gradation level 0 is achieved by setting four pixel values to the gradation level 0. Display at an average gradation level 1 is achieved by setting three pixel values to the gradation level 0 and one pixel value to the gradation level 4. Display at an average gradation level 2 is achieved by setting two pixel values to the gradation level 0 and two pixel values to the gradation level 4. Display at an average gradation level 3 is achieved by setting one pixel value to the gradation level 0 and three pixel values to the gradation level 4. That is, each of the values in the dither matrix is compared with N (N is a gradation level to be displayed). If the value in the dither matrix is smaller than N, a pixel value is set to the gradation level 4. If the value in the dither matrix is equal to or larger than N, a pixel value is set to the gradation level 0.

In the case of a pixel the value of which falls within the range of the gradation levels 4 to 7, the gradation level 0 is replaced by the gradation level 4 and the gradation level 4 is replaced by the gradation level 8 in the above description.

As described previously, image data is converted by the pseudo gradation processing 112 so that it is displayed using only the gradation levels 0, 4, and 8 to 15. The number of gradation levels to be displayed is 10 like in the first embodiment. Accordingly, the group classification procedure 113, the first procedure 114, and the second procedure 115 are the same as the group classification procedure 101, the first procedure 102, and the second procedure 103, respectively, and the description thereof will be therefore omitted.

In the second embodiment, among the gradation levels 0 to 15, the gradation levels 1 to 3 that are dark intermediate gradation levels are created by pseudo gradation processing using the gradation levels 0 and 4 and the gradation levels 5 to 7 that are slightly dark gradation levels are created by pseudo gradation processing using the gradation levels 4 and 8. Highly-stable and highly-uniform gradations obtained in the second procedure are mainly used for display. Accordingly, even if the gradation level 4 that is close to black and is insufficient in stability and uniformity is mixed with the gradations, graininess is not greatly increased and desirable display may be performed.

Next, a display apparatus according to a third embodiment of the present invention will be described. A display apparatus according to the third embodiment is the same as a display apparatus according to the second embodiment except that the number of gradation levels written in the first procedure is increased to four and the number of gradation levels to be displayed is 12.

Figure 24:
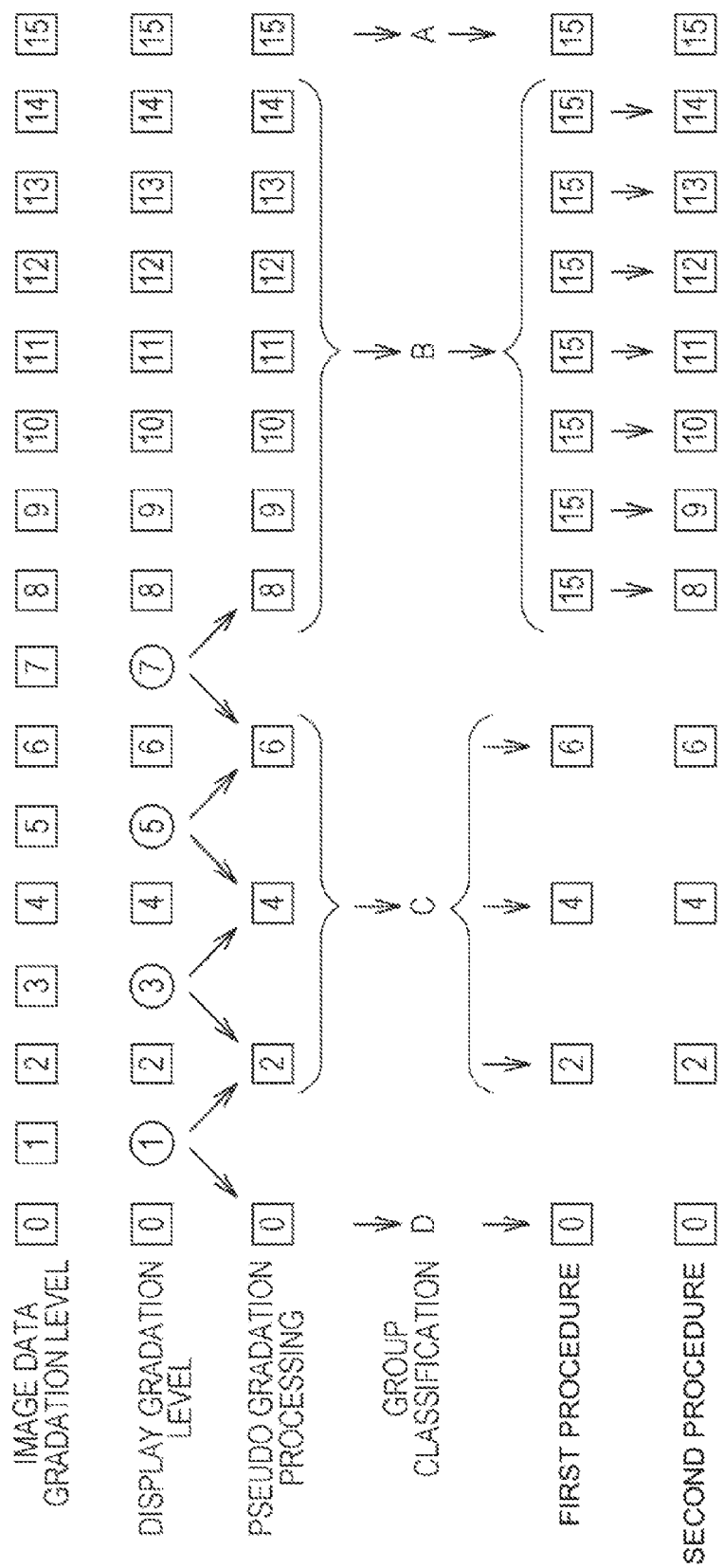
FIG. 24 is a diagram describing processing performed for each gradation level according to a third embodiment of the present invention.

FIG. 24 is a diagram describing processing performed for each gradation level according to the third embodiment.

As illustrated in FIG. 24, there is 16-gradation-level (0 to 15) display data. In the display gradation level number determination procedure 111, it is determined that the gradation levels 0, 2, 4, 6, and 8 to 15, twelve gradation levels in total, are displayed and the gradation levels 1, 3, 5, and 7, four gradation levels in total, are not displayed.

The darkest gradation level among the gradation levels that are changed from the gradation level 15 and are then written in the second procedure is the gradation level 8. Accordingly, each of the gradation levels 0 to 7 is represented by mixing the gradation level 0, 2, 4, or 6 written in the first procedure 113 with the gradation level 8 written in the second procedure in pseudo gradation processing. The pseudo gradation processing employs the ordered dither method using a Bayer-type dither matrix of 2 dots×2 dots like in the second embodiment.

Figures 25, 26:
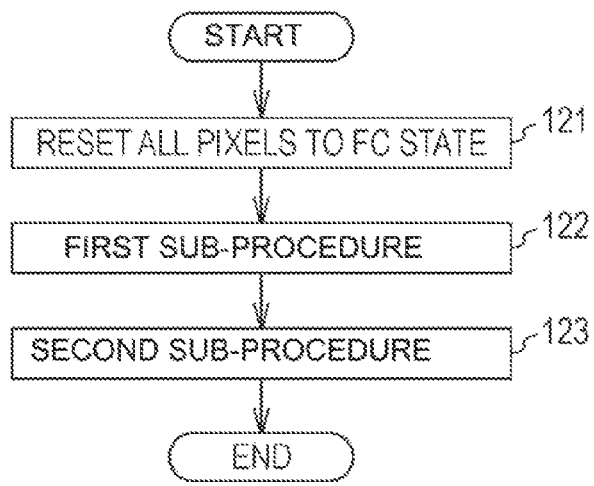
FIG. 25 is a diagram illustrating the matrix representation of each gradation level for which pseudo gradation processing according to the third embodiment is performed.
FIG. 26 is a flowchart illustrating a process of a first procedure performed by a display apparatus according to a fourth embodiment.

Display at an average gradation level 0 is achieved by setting four pixel values to the gradation level 0. Display at an average gradation level 1 is achieved by setting two pixel values to the gradation level 0 and two pixel values to the gradation level 2. Display at the other average gradation levels is similarly achieved, and the description thereof will be therefore omitted. FIG. 25 illustrates pixel values obtained after pseudo gradation processing according to the third embodiment.

In the group classification procedure according to the third embodiment, the gradation level 15 is put in a group A, the gradation levels 8 to 14 are put in a group B, the gradation levels 2, 4, and 6 are put in a group C, and the gradation level 0 is put in a group D.

In the first procedure according to the third embodiment, writing processing is performed using the dynamic driving method so that pixels belonging to the groups A and B have the gradation level 15, pixels belonging to the group C have corresponding gradation levels 2, 4, and 6, and pixels belonging to the group D have the gradation level 0.

Writing of the gradation levels 2, 4, and 6 is performed by setting a pulse length used in the selection period on the basis of the graph illustrated in FIG. 17. More specifically, in the case of the gradation level 2, a pulse width is set to 0.18 ms to obtain 23% of the highest reflectance. In the case of the gradation level 4, a pulse width is set to 0.21 ms to obtain 34% of the highest reflectance. In the case of the gradation level 6, a pulse width is set to 0.22 ms to obtain 45% of the highest reflectance. Like in the first embodiment, a pulse width is set to 0 ms in the case of the gradation level 0, and is set to 1 ms in the case of the gradation level 15.

In the second procedure 103, like in the first and second embodiments, writing processing is performed using a non-dynamic driving method so that the gradation levels of pixels belonging to the group B are changed from the gradation level 15 to the corresponding display gradation levels 8 to 14. The detailed description thereof will be therefore omitted.

It is possible to select one of display apparatuses according to the first to third embodiments having the same configuration illustrated in FIG. 11 only by changing processing performed by the control circuit 27.

In the first to third embodiments, the dynamic driving method is used in the first procedure. However, the non-dynamic driving method using the area B on the right side of FIG. 2 may be used to perform the first procedure.

A display apparatus according to a fourth embodiment of the present invention is the same as a display apparatus according to the second embodiment except that a first procedure is performed using the non-dynamic driving method using the area B.

FIG. 26 is a flowchart illustrating a process of the first procedure performed by a display apparatus according to the fourth embodiment. As illustrated in FIG. 26, the first procedure includes a reset procedure 121 of resetting all pixels to the focal conic (FC) state, a first sub-procedure 122, and a second sub-procedure 123.

In the reset procedure 121, after an intense electric field has been applied to a liquid crystal to bring the liquid crystal into the homeotropic state, all pixels are brought into the focal conic state by further applying a weak electric field to the liquid crystal and removing the electric field or by gradually removing the intense electric field for a long time. This process is simultaneously performed upon all pixels, and a time required for the process is short. Furthermore, it is possible to take a long time to obtain the lowest gradation level corresponding to sufficient black.

Figure 27:
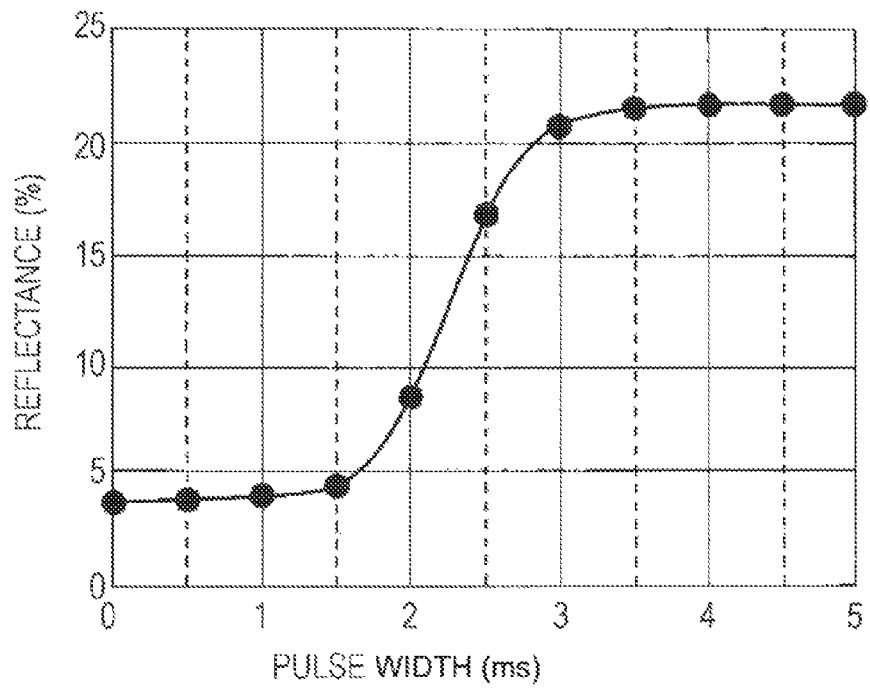
FIG. 27 is a diagram illustrating the relationship between the application time of a pulse in the first procedure according to the fourth embodiment and a reflectance.

In the first sub-procedure 122 and the second sub-procedure 123, writing of gradation levels 0, 4, and 15, three gradation levels in total, is performed using the non-dynamic driving method using the area B on the right side of FIG. 2 by performing application of a high-voltage pulse. If the voltage of the pulse is 40 V, the relationship between the application time of the pulse and the reflectance of a pixel to which the pulse is applied is as illustrated in FIG. 27. In FIG. 27, minimum reflectance of 3.5% (gradation level 0) is obtained without applying any pulse. Reflectance of 5.75% (gradation level 2) is obtained by applying pulse with a pulse width of 1.8 ms. Reflectance of 8.0% (gradation level 4) is obtained by applying pulse with a pulse width of 1.97 ms. Reflectance of 10.25% (gradation level 6) is obtained by applying pulse with a pulse width of 2.12 ms. Maximum reflectance of 21.5% (gradation level 15) is obtained by applying pulse with a pulse width of 5 ms.

In the fourth embodiment, like in the second procedure according to the first embodiment, the cumulative time of a pulse applied in the first sub-procedure 122 and the second sub-procedure 123 is determined on the basis of the relationship illustrated in FIG. 27. More specifically, in the first sub-procedure 122, scanning is performed so that a pulse with a pulse width of 1.97 ms is applied. As a result, pixels for which the gradation level 4 is to be set are brought into the ON state, and the other pixels are brought into the OFF state. Furthermore, in the second sub-procedure 123, scanning is performed so that a pulse with a pulse width 5 ms is applied. As a result, pixels for which the gradation level 15 is to be set and which originally have any one of the gradation levels 8 to 15 are brought into the ON state, and the other pixels are brought into the OFF state. Accordingly, no pulse is applied to pixels having the gradation level 0.

The second procedure is the same as that according to the second embodiment, and the description thereof will be therefore omitted.

The first procedure according to the first embodiment may be performed in the fourth embodiment. In that case, writing of the gradation levels 0 and 10 is performed like writing of the gradation levels 0 and 15 according to the second embodiment, and a pulse width is set for the gradation level 1 and writing of the gradation level 1 is performed like writing of the gradation level 4 according to the second embodiment. If the reflectance at the gradation level 1 in the first embodiment is the same as that at the gradation level 4 in the second embodiment, the same condition may be used.

The first procedure according to the third embodiment may be similarly performed in the fourth embodiment. In that case, a third sub-procedure and a fourth sub-procedure are performed in addition to the first sub-procedure and the second sub-procedure. In the first sub-procedure, scanning is performed so that a pulse with a pulse width of 1.80 ms is applied. As a result, pixels for which the gradation level 2 is to be set are brought into the ON state, and the other pixels are brought into the OFF state. In the second sub-procedure, scanning is performed so that a pulse with a pulse width of 1.97 ms is applied. As a result, pixels for which the gradation level 4 is to be set are brought into the ON state, and the other pixels are brought into the OFF state. In the third sub-procedure, scanning is performed so that a pulse with a pulse width of 2.12 ms is applied. As a result, pixels for which the gradation level 6 is to be set are brought into the ON state, and the other pixels are brought into the OFF state. In the fourth sub-procedure, scanning is performed so that a pulse with a pulse width of 5 ms is applied. As a result, pixels for which the gradation level 15 is to be set and which originally have any one of the gradation levels 8 to 15 are brought into the ON state, and the other pixels are brought into the OFF state. Accordingly, no pulse is applied to pixels having the gradation level 0.

A display apparatus according to the fourth embodiment has the same configuration as that of display apparatuses according to the first to third embodiments illustrated in FIG. 11, and may be realized by changing processing performed by the control circuit 27.

In the first and second embodiments, writing of three gradation levels is performed in the first procedure. In the third embodiment, writing of five gradation levels is performed in the first procedure. However, the number of gradation levels written in each of the first and second procedures may be determined by the control circuit in accordance with various conditions such as a driving method, a panel, a display mode, and an ambient temperature. The display gradation level number determination procedure 111 according to the second embodiment will be described.

As illustrated in FIG. 19, the control circuit 27 included in a display apparatus according to the second embodiment receives a display mode signal set by a user or the like. The display mode signal is used to set, for example, a draft mode or a high-image-quality mode. In the case of the draft mode, the control circuit 27 sets the gradation levels 0 and 15, two gradation levels in total, as gradation levels written in the first procedure, and sets the gradation levels 8 to 14, seven gradation levels in total, as gradation levels written in the second procedure. Furthermore, the control circuit 27 expresses the gradation levels 1 to 7, seven gradation levels in total, using the gradation levels 0 and 8 by performing pseudo gradation processing. In the case of the high-image-quality mode, the control circuit 27 sets the gradation levels 0, 4, and 15, three gradation levels in total, as gradation levels written in the first procedure and sets the gradation levels 8 to 14, seven gradation levels in total, as gradation levels written in the second procedure. Furthermore, the control circuit 27 expresses the gradation levels 1 to 3 and the gradation levels 5 to 7, six gradation levels in total, using the gradation levels 0, 4, and 8 by performing the pseudo gradation processing. Accordingly, in the high-quality-image mode, the above-described processing according to the second embodiment is performed.

The high-image-quality mode may be divided into a first high-image-quality mode and a second high-image-quality mode. In this case, in the first high-image-quality mode, like in the second embodiment, writing of the gradation levels 0, 4, and 15, three gradation levels in total, is performed in the first procedure. In the second high-image-quality mode, like in the third embodiment, writing of the gradation levels 0, 2, 4, 6, and 15, five gradation levels in total, is performed in the first procedure. The other processing operations are the same as those according to the second and third embodiments.

In the high-image-quality mode, like in the first procedure according to the fourth embodiment, after all pixels have been brought into the focal conic state, the first procedure may be performed using the non-dynamic driving method using the area B on the right side of FIG. 2. If the high-image-quality mode is divided into the first high-image-quality mode and the second high-image-quality mode, writing of the gradation levels 0, 4, and 15, three gradation levels in total, is performed using the dynamic driving method in the first procedure in the first high-image-quality mode and writing of the gradation levels 0, 2, 4, 6, and 15, five gradation levels in total, is performed using the non-dynamic driving method in the first procedure in the second high-image-quality mode.

Figure 28:
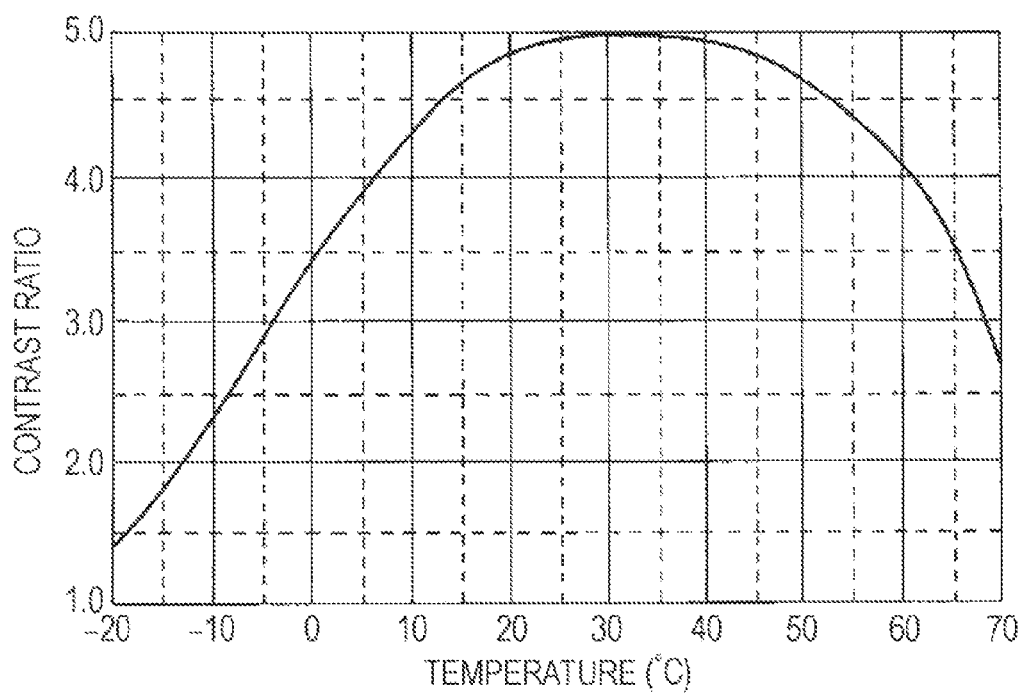
FIG. 28 is a diagram illustrating the change in a contrast ratio realized by a cholesteric liquid crystal display panel which is caused by the change in an ambient temperature.

FIG. 28 is a diagram illustrating the relationship between an ambient temperature and a contrast that can be displayed by a cholesteric liquid crystal display apparatus. As illustrated in FIG. 28, the highest contrast is obtained at a normal temperature (approximately 30° C.), and decreases with decrease and increase in temperature from the normal temperature. A contrast value is 5.0 at a normal temperature. In the operating temperature range of the display apparatus extending from −20° C. to 70° C., the lowest contrast of 1.4 is obtained at −20° C.

Here, it is assumed that the number of gradation levels displayed at a normal temperature is 16. If a gradation level (reflectance) is represented with the log linear model, a contrast common logarithm per gradation level is $\log_{10}(5.0/15)=0.0466$. If display is performed at −20° C. at which the lowest contrast is obtained using the same scale (intervals of the contrast common logarithm) as that at a normal temperature, $\log_{10}(1.4/0.0466)=3.14$ is derived and the number of gradation levels is therefore 4. The same result is produced at a high temperature.

A temperature sensor for detecting an ambient temperature (not illustrated) is disposed so that ambient temperature data is input into the control circuit 27 as illustrated in FIG. 19. The control circuit 27 performs the following control processing on the basis of received ambient temperature data.

At high and low temperatures, the gradation levels 0 and 15, two gradation levels in total, are written in the first procedure, and four gradation levels are written in the second procedure. The four gradation levels written in the second procedure are, for example, the gradation levels 8, 10, 12, and 14. At a normal temperature, like in the third embodiment, the gradation levels 0, 2, 4, and 6, five gradation levels in total, are written in the first procedure, and the gradation levels 8 to 14, seven gradation levels in total, are written in the second procedure.

Furthermore, the control circuit 27 may perform the following control processing in accordance with the frequency of occurrence of a pixel value.

If the frequency of a gradation level that is slightly darker than a substantially intermediate between white and black is high, a wide range of gradation levels brighter than a gradation level darker than a substantially intermediate between white and black is set as a gradation level written in the second procedure. Accordingly, in the first procedure, gradation levels between the gradation level darker than a substantially intermediate between white and black and the lowest gradation level corresponding to black are written. If the frequency of a gradation level that is slightly darker than a substantially intermediate between white and black is low, a narrow range of gradation levels brighter than a substantially intermediate between white and black is set as a gradation level written in the second procedure. Accordingly, in the first procedure, gradation levels between the gradation level brighter than a substantially intermediate between white and black and the lowest gradation level corresponding to black are written.

Still furthermore, the control circuit 27 may perform the following control processing in accordance with an R, G, or B color.

On a blue display panel, a wide range of gradation levels including a gradation level slightly darker than a substantially intermediate between white and black is written in the first procedure. On a green display panel, a narrow range of gradation levels including only gradation levels close to black is written in the first procedure.

The sensitivity of human eyes to graininess of a blue image is considerably low. By covering a wide range of gradation levels with the first driving waveform achieving high-speed driving, it is possible to quickly obtain an image including a large blue portion.

The sensitivity of human eyes to graininess of a green image is the highest. By covering only a narrow range of gradation levels in the first procedure in which an image with a high degree of graininess is written, it is possible to minimize the graininess of an entire image.

Still furthermore, the control circuit 27 may perform the following processing on the basis of image data.

In the first procedure, a driving waveform (pulse) is applied to all display lines. In the second procedure, it is determined for each display line whether a gradation pixel to be written is present. If there are no gradation pixels, the application of a driving waveform (pulse) is not performed in the second procedure. A driving waveform (pulse) is applied only to a line including a gradation pixel.

In the case of an image mainly composed of characters and lines, since the application of a driving waveform for comparatively low-speed driving is skipped in many display lines in the second procedure, a time required for display is markedly shortened.

As described previously, according to the embodiments of the present invention, it is possible to provide a display apparatus with a cholesteric liquid crystal display panel and a driving method of the cholesteric liquid crystal display panel capable of achieving excellent stability and uniformity of gradations and rapidly displaying a gradation/full-color image with a high contrast. For example, if the number of lines of a display panel is 1000, it takes 10 seconds to display a full-color image with excellent gradation in an intermediate-contrast image display mode and 24 seconds to display it in a high-contrast image display mode using a technique in the related art. However, according to the embodiments of the present invention, it is possible to display a full-color image with excellent gradation in 3 seconds in an intermediate-contrast image display mode and in 6 seconds in a high-contrast image display mode.

While the embodiments of the present invention have been described, it is to be noted that the disclosed technique is not limited thereto.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A display apparatus comprising:
    a cholesteric liquid crystal display panel;
    a control circuit which classifies pixels into a first group for a highest gradation level, a second group for a lowest gradation level, a third group for a low intermediate gradation level close to the lowest gradation level, and fourth group for a high intermediate gradation level between the highest gradation level and the low intermediate gradation level in accordance with a gradation level to be displayed; and
    a driving circuit which applies, to the cholesteric liquid crystal display panel, a first driving waveform so as to bring pixels belonging to the first group and the fourth group into a state corresponding to the highest gradation level, pixels belonging to the second group into a state corresponding to the lowest gradation level and pixels belonging to the third group into states corresponding to gradation levels to be displayed, and a second driving waveform so as to bring pixels belonging to the fourth group into states corresponding to gradation levels to be displayed.

2. The display apparatus according to claim 1, wherein the highest gradation level corresponds to a planar state, the lowest gradation level corresponds to a focal conic state, the low intermediate gradation level and the high intermediate gradation level correspond to states in which the planar state and the focal conic state coexist, and a gradation level varies in accordance with a mixture ratio between the planar state and the focal conic state.

3. The display apparatus according to claim 2,
    wherein the driving circuit applies the first driving waveform to the cholesteric liquid crystal display panel to bring all pixels into the focal conic state, bringing the pixels belonging to the first group and the fourth group into the planar state, and bringing the pixels belonging to the third group into a state in which the planar state and the focal conic state coexist by dynamic driving, and applies the second driving waveform to the cholesteric liquid crystal display panel to bring the pixels belonging to the fourth group into the state in which the planar state and the focal conic state coexist by non-dynamic driving.

4. The display apparatus according to claim 1,
    wherein the driving circuit applies the first driving waveform by dynamic driving and applies the second driving waveform by non-dynamic driving.

5. The display apparatus according to claim 1, wherein the control circuit further determines a number of gradation levels to be displayed and a value of each of the gradation levels based on at least one of a display mode, an ambient temperature, a frequency of occurrence of a pixel value and a color of a display panel.

6. The display apparatus according to claim 1,
wherein a number of gradation levels to be displayed is smaller than a number of gradation levels of image data, and
wherein the control circuit further converts image data into processed image data by performing pseudo gradation processing upon the image data on the basis of the number of gradation levels to be displayed and classifies the pixels of the processed image data.

7. The display apparatus according to claim 1, wherein the driving circuit applies the first driving waveform for all display lines and applies the second driving waveform for only a display line including a pixel belonging to the fourth group.

8. A driving method of a cholesteric liquid crystal display panel for performing multi-gradation display comprising:
classifying pixels into a first group for a highest gradation level, a second group for a lowest gradation level, a third group for a low intermediate gradation level close to the lowest gradation level, and a fourth group for a high intermediate gradation level between the highest gradation level and the low intermediate gradation level in accordance with a gradation level to be displayed;
first applying a first driving waveform to the cholesteric liquid crystal display panel so as to bring pixels belonging to the first group and the fourth group into a state corresponding to the highest gradation level, pixels belonging to the second group into a state corresponding to the lowest gradation level, and pixels belonging to the third group into states corresponding to gradation levels to be displayed; and
second applying a second driving waveform to the cholesteric liquid crystal display panel so as to bring pixels belonging to the fourth group into states corresponding to gradation levels to be displayed.

9. The driving method according to claim 8, wherein
the first applying the first driving waveform by dynamic driving and the second applying the second driving waveform by non-dynamic driving.

10. The driving method according to claim 8, wherein
the first applying the first driving waveform to the cholesteric liquid crystal display panel to bring all pixels into focal conic state, bringing the pixels belonging to the first group and the fourth group into planar state, and bringing the pixels belonging to the third group into a state in which the planar state and the focal conic state coexist by dynamic driving, and
the second applying the second driving waveform to the cholesteric liquid crystal display panel to bring the pixels belonging to the fourth group into the state in which the planar state and the focal conic state coexist by non-dynamic driving.

11. The driving method according to claim 8, further comprising determining a number of gradation levels to be displayed and a value of each of the gradation levels based on at least one of a display mode, an ambient temperature, a frequency of occurrence of a pixel value and a color of a display panel.

12. The driving method according to claim 8,
wherein a number of gradation levels to be displayed is smaller than a number of gradation levels of image data, the method further comprises:
converting image data into processed image data by performing pseudo gradation processing upon the image data on the basis of the number of gradation levels to be displayed, and
classifying the pixels of the processed image data.

13. The driving method according to claim 8, wherein the first applying the first waveform for all display lines and the second applying the second waveform for only a display line including a pixel belonging to the fourth group.

14. A display driving controller comprising:
a control circuit which classifies pixels into a first group for a highest gradation level, a second group for a lowest gradation level, a third group for a low intermediate gradation level close to the lowest gradation level, and a fourth group for a high intermediate gradation level between the highest gradation level and the low intermediate gradation level in accordance with a gradation level to be displayed, and generates a first control signal for applying a first driving waveform so as to bring pixels belonging to the first group and the fourth group into a state corresponding to the highest gradation level, pixels belonging to the second group into a state corresponding to the lowest gradation level and pixels belonging to the third group into states corresponding to gradation levels to be displayed, and a second control signal for applying a second driving waveform so as to bring pixels belonging to the fourth group into states corresponding to gradation levels to be displayed.

15. The display driving controller according to claim 14, further comprising:
a driving circuit which applies, to a cholesteric liquid crystal display panel, the first driving waveform according to the first control signal and the second driving waveform according to the second control signal.

16. The display driving controller according to claim 14,
wherein the driving circuit generates the first control signal for applying the first driving waveform by dynamic driving and the second control signal for applying the second driving waveform by non-dynamic driving.

17. The display driving controller according to claim 14,
wherein the control circuit generates the first control signal for applying the first driving waveform to a display to bring all pixels into a focal conic state, bringing the pixels belonging to the first group and the fourth group into the planar state, and bringing the pixels belonging to the third group into a state in which the planar state and the focal conic state coexist by dynamic driving, and the second control signal for applying the second driving waveform to the display to bring the pixels belonging to the fourth group into the state in which the planar state and the focal conic state coexist by non-dynamic driving.

18. The display driving controller according to claim 14, wherein the control circuit further determines a number of gradation levels to be displayed and a value of each of the gradation levels based on at least one of a display mode, an ambient temperature, a frequency of occurrence of a pixel value and a color of a display panel.

19. The display driving controller according to claim 14,
wherein a number of gradation levels to be displayed is smaller than a number of gradation levels of image data, and
wherein the control circuit further converts image data into processed image data by performing pseudo gradation processing upon the image data on the basis of the number of gradation levels to be displayed and classifies the pixels of the processed image data.

20. The display driving controller according to claim 14, wherein the control circuit generates the first control signal for applying the first driving waveform for all display lines and the second control signal for applying the second driving waveform for only a display line including a pixel belonging to the 4th group.

* * * * *